(12) United States Patent
Ide et al.

(10) Patent No.: US 6,411,918 B1
(45) Date of Patent: Jun. 25, 2002

(54) METHOD AND APPARATUS FOR INPUTTING THREE-DIMENSIONAL DATA

(75) Inventors: Eiichi Ide, Itami; Hiroshi Uchino, Kyoto, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/455,536

(22) Filed: Dec. 7, 1999

(30) Foreign Application Priority Data

Dec. 8, 1998 (JP) .......................................... 10-347695
Dec. 8, 1998 (JP) .......................................... 10-347696

(51) Int. Cl.⁷ .............................................. G01B 11/00
(52) U.S. Cl. ...................... 702/150; 702/152; 702/159; 356/608
(58) Field of Search ................................ 702/150, 152, 702/153, 155, 159; 250/559.11, 559.29, 559.31, 559.32; 356/602, 608

(56) References Cited

U.S. PATENT DOCUMENTS

| | | | | |
|---|---|---|---|---|
| 5,212,392 A | * | 5/1993 | Berkcan et al. | 250/559.35 |
| 5,291,463 A | * | 3/1994 | Ichikawa et al. | 369/13 |
| 5,668,595 A | * | 9/1997 | Katayama et al. | 348/218 |
| 5,668,631 A | | 9/1997 | Norita et al. | |
| 5,757,674 A | * | 5/1998 | Marugama | 702/152 |
| 6,243,165 B1 | * | 6/2001 | Norita et al. | 250/559.22 |

FOREIGN PATENT DOCUMENTS

JP 10002722 1/1998

* cited by examiner

*Primary Examiner*—Bryan Bui
(74) *Attorney, Agent, or Firm*—McDermott, Will & Emery

(57) ABSTRACT

A three-dimensional data input apparatus has a first and a second modes. In the first mode, images of an object are taken from two view points being apart from each other, the position of the object is calculated with high accuracy in accordance with the distance between the view points and the directions from each view point to the irradiated part of the object by the method of triangulation, and the calculated data or the data for calculation is output. In the second mode, the position of a part of the object is calculated in accordance with the irradiation angle and the reception angle in the same way as the conventional method of triangulation. In the first mode that does not use the irradiation angle information for calculating the position.

15 Claims, 21 Drawing Sheets

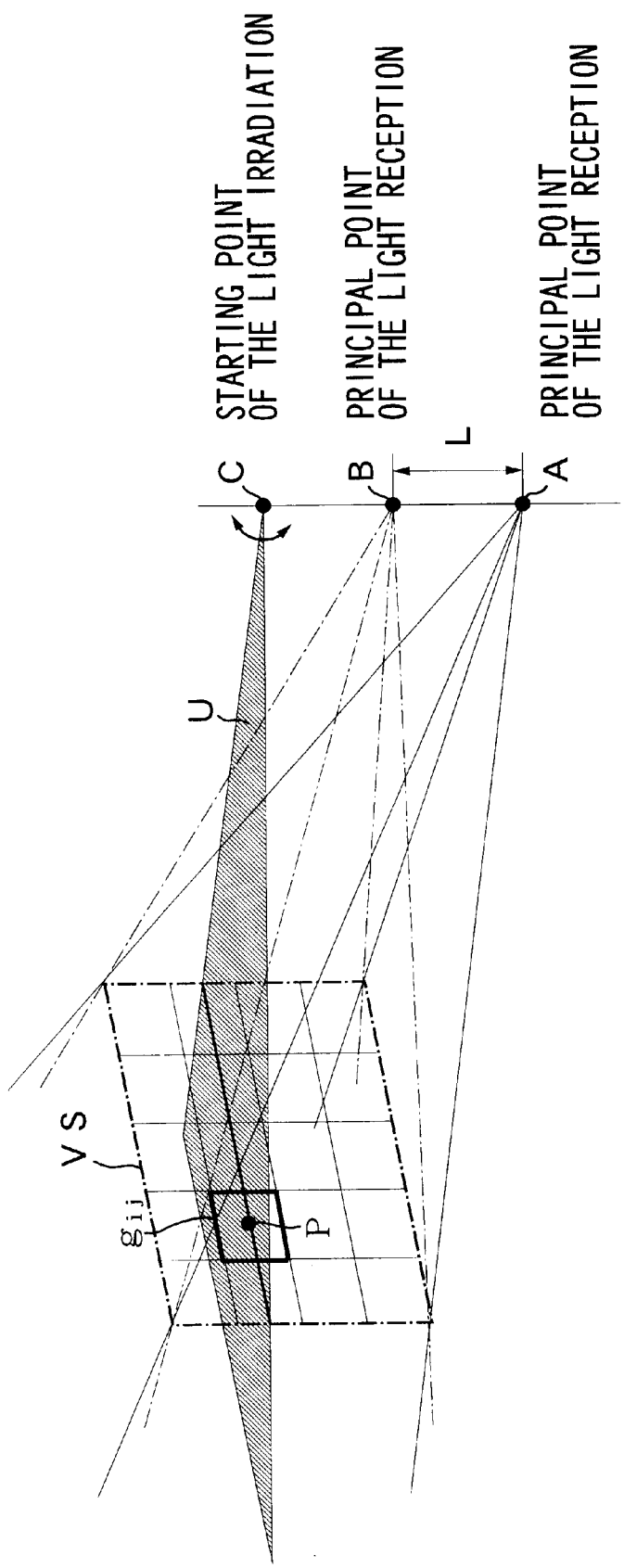

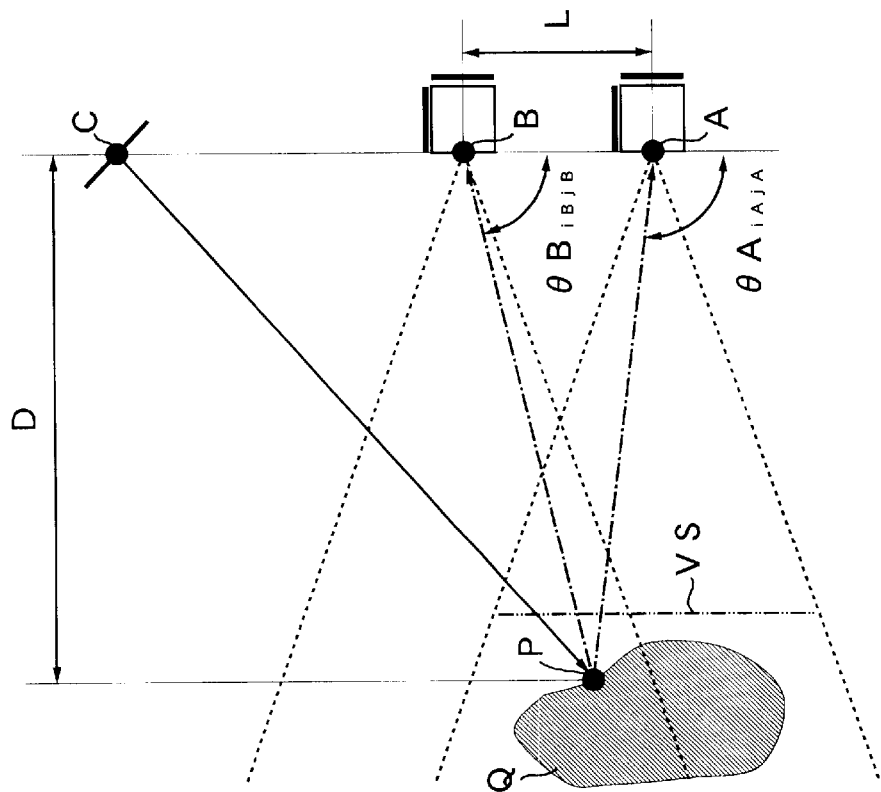
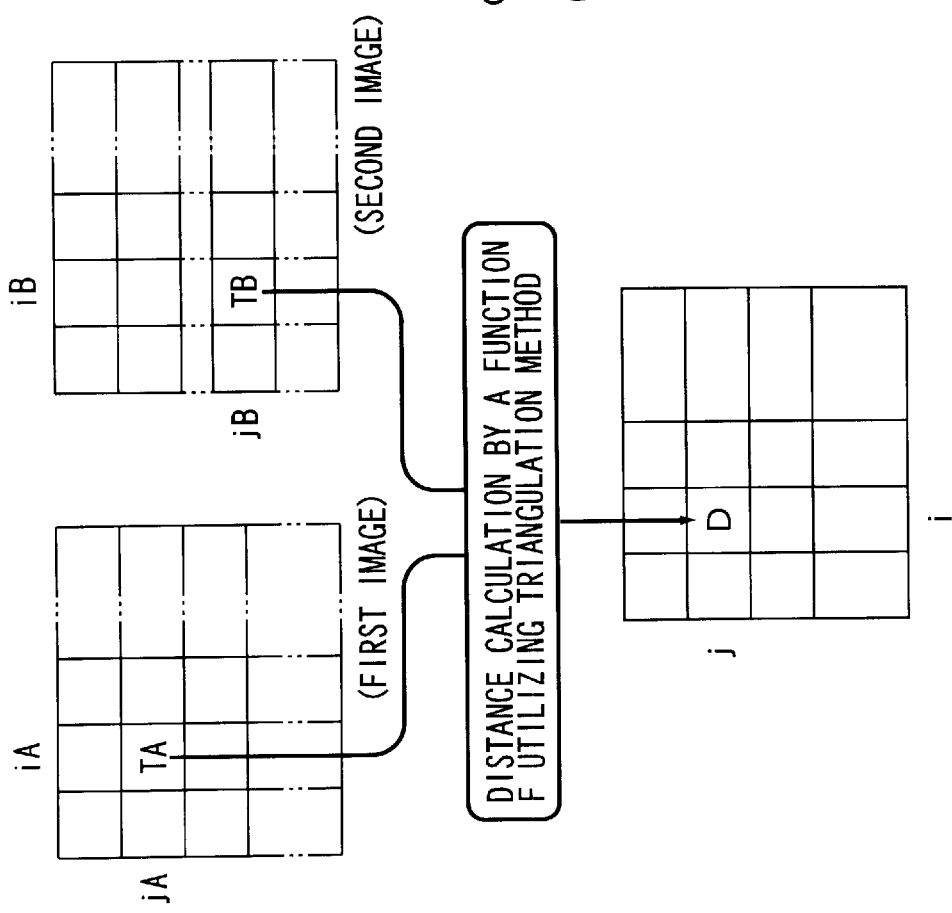

Fig. 4
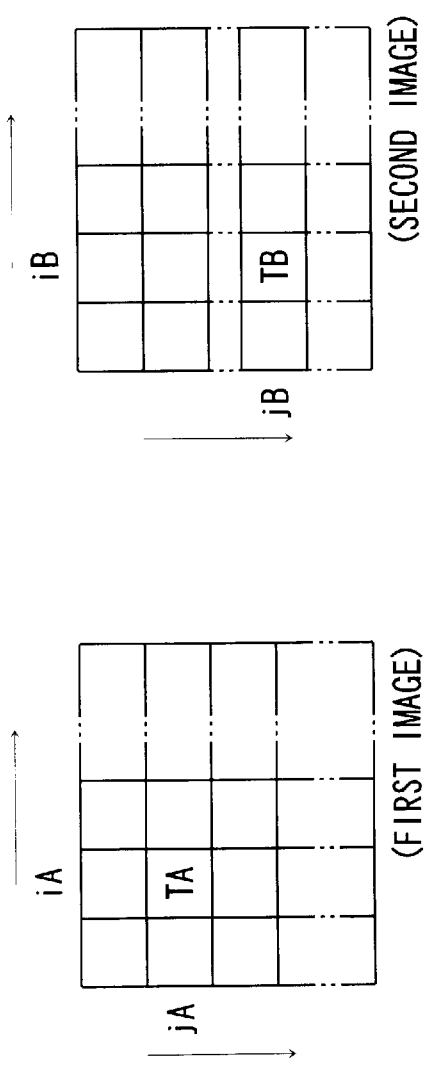
(FIRST IMAGE)
(SECOND IMAGE)
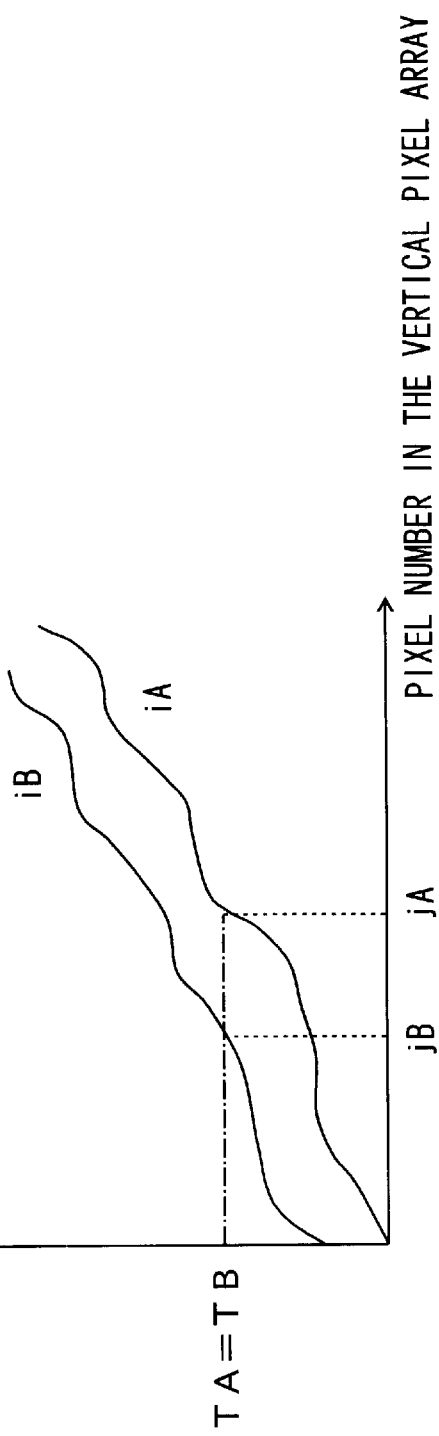

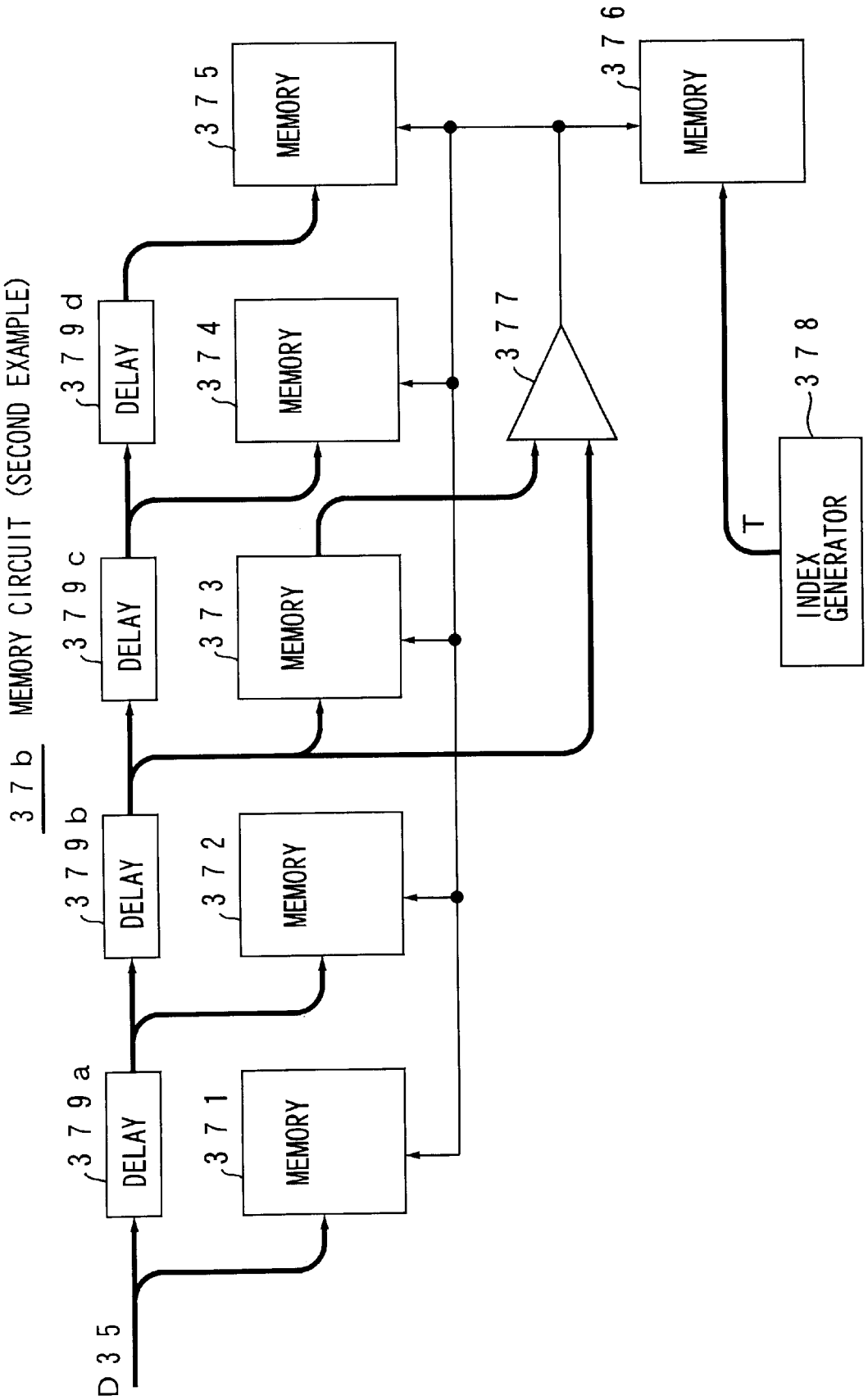

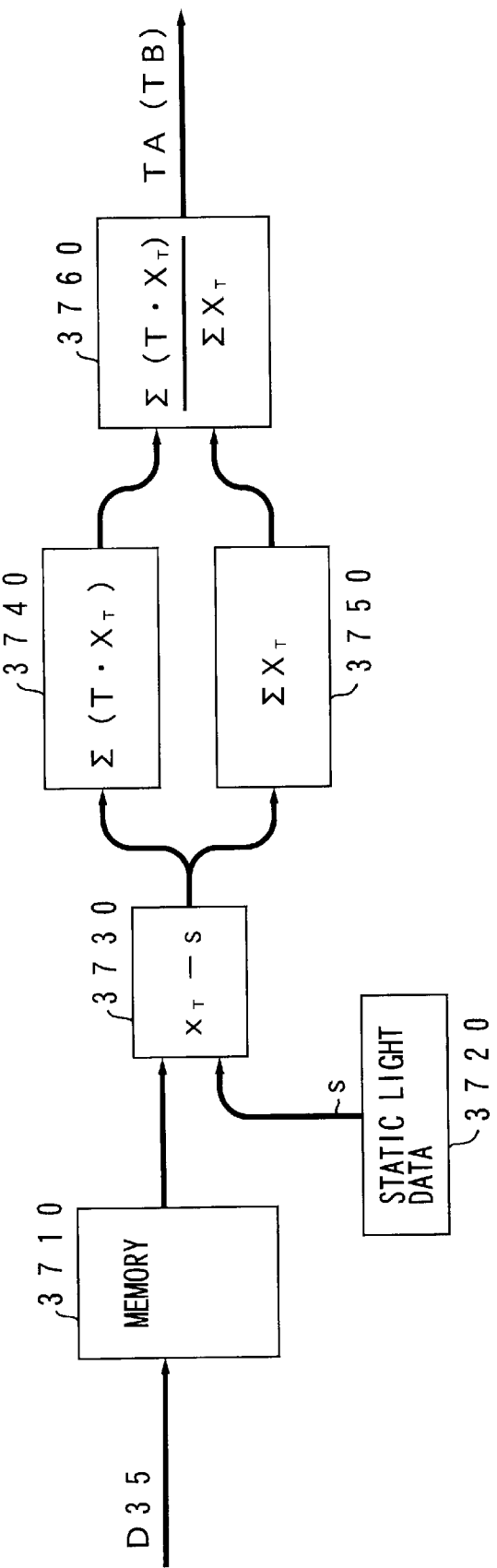
Fig. 8  37c MEMORY CIRCUIT (THIRD EXAMPLE)

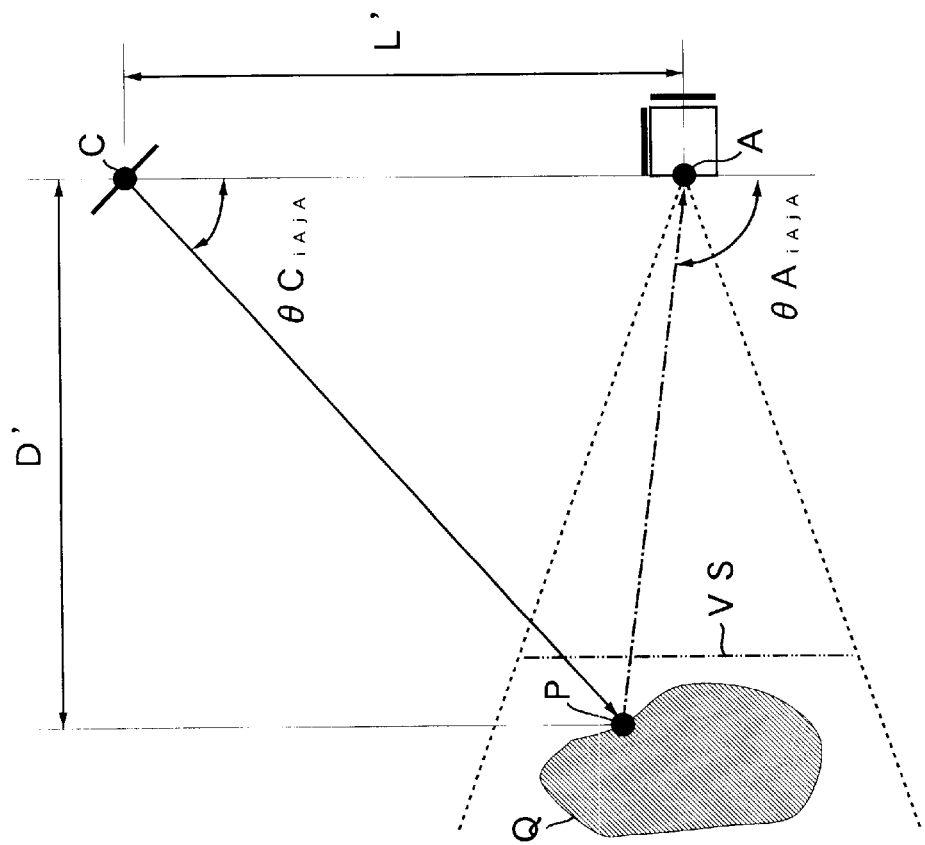
Fig. 10B
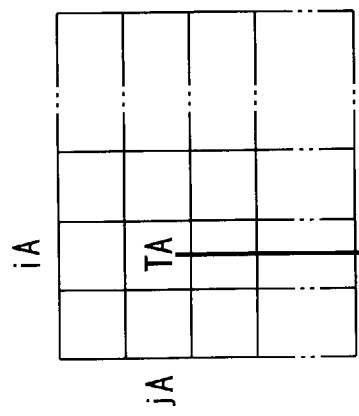
Fig. 10A
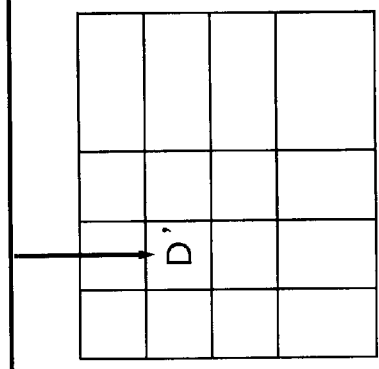
DISTANCE CALCULATION BY A FUNCTION F' UTILIZING TRIANGULATION METHOD

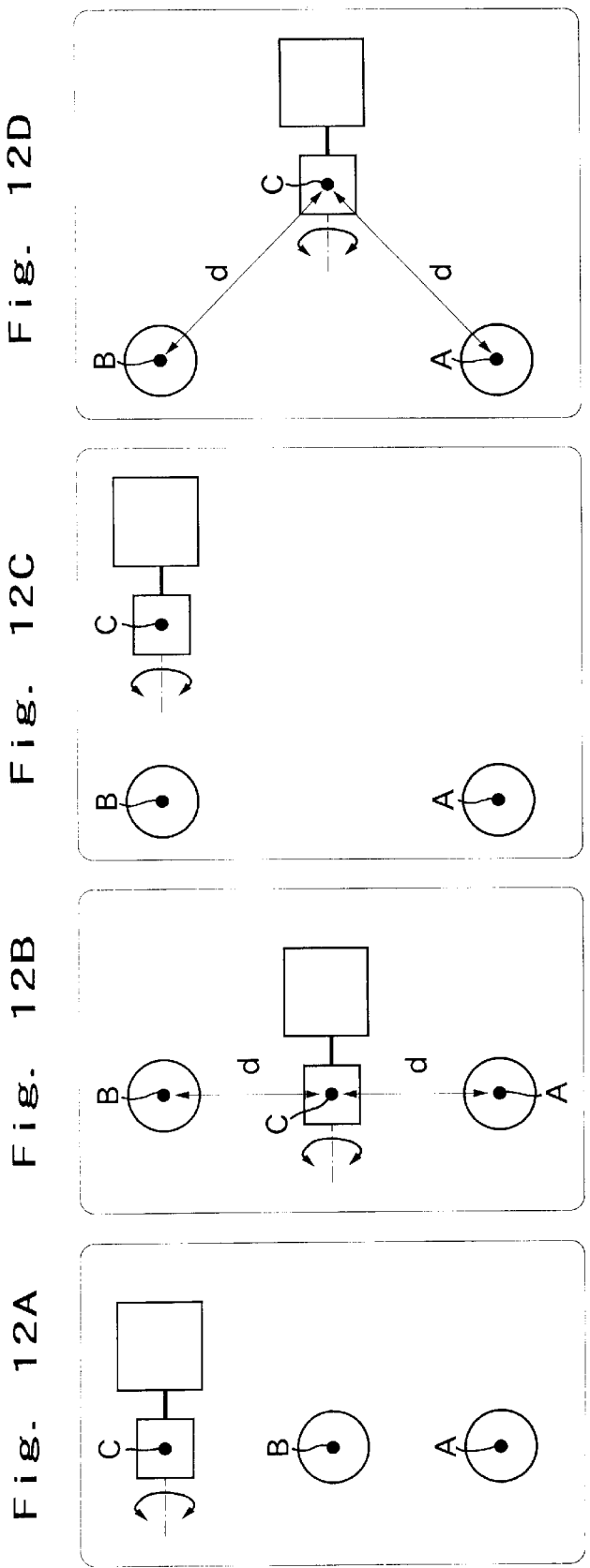

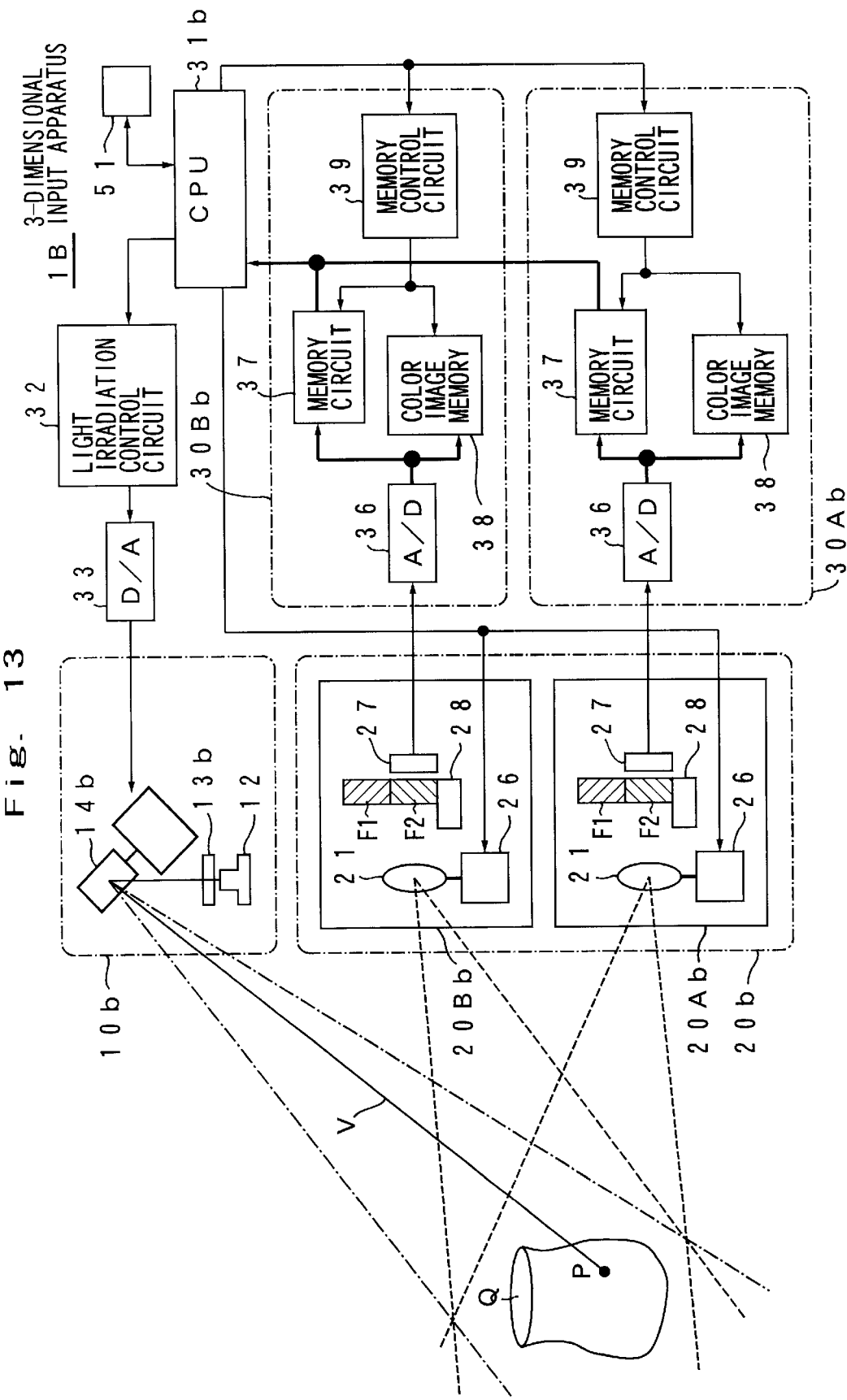

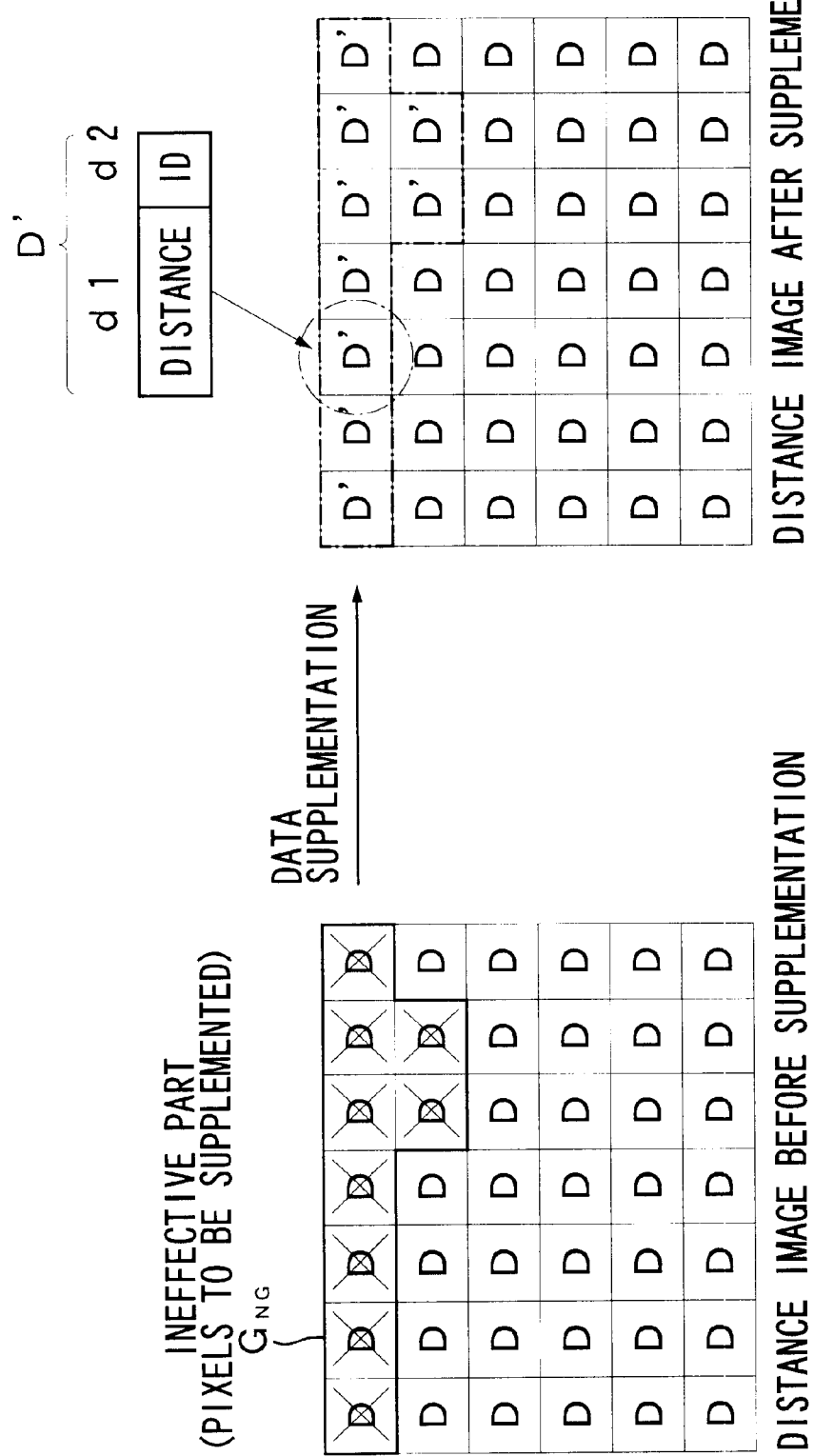

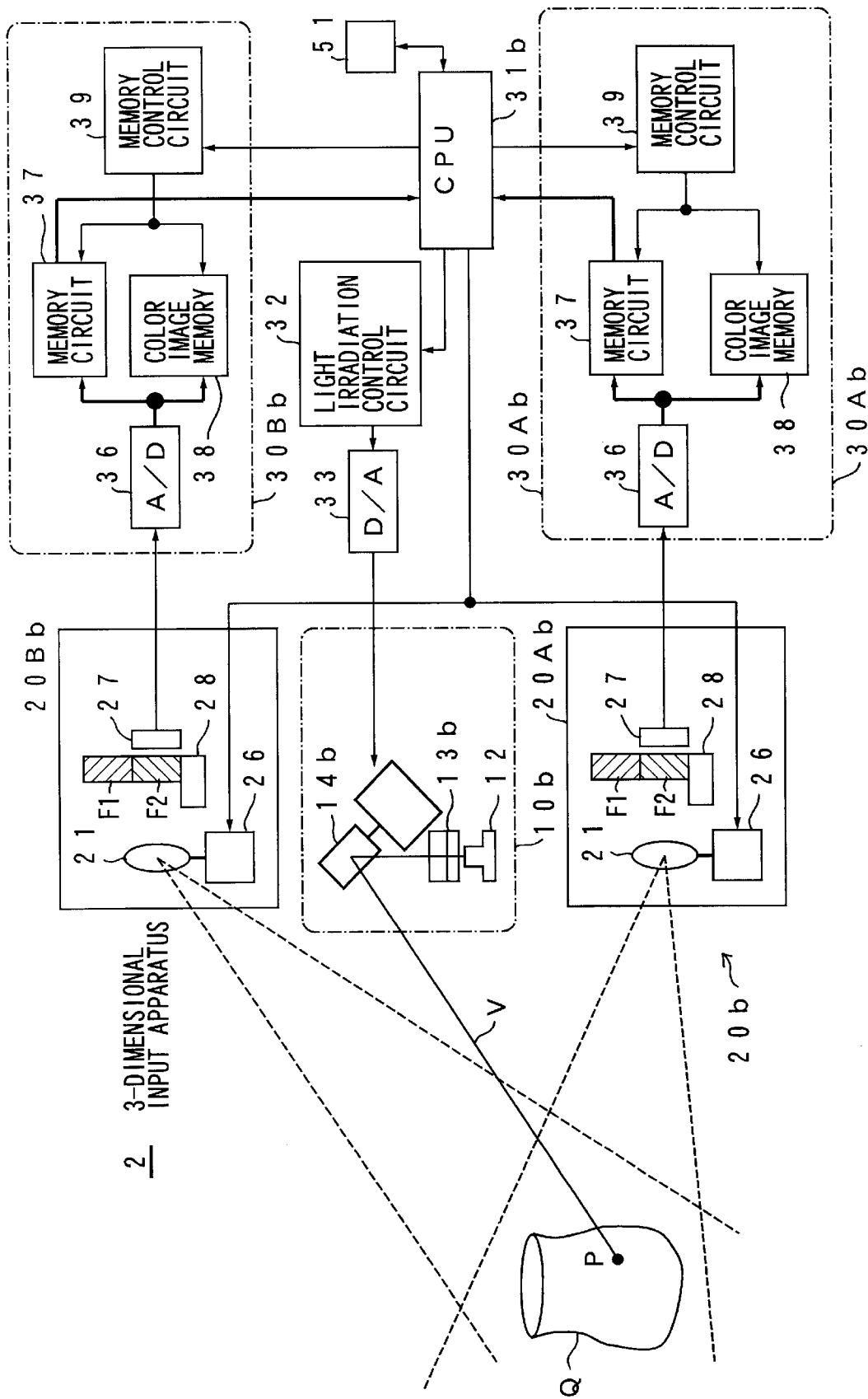

METHOD AND APPARATUS FOR INPUTTING THREE-DIMENSIONAL DATA

BACKGROUND OF THE INVENTION

This application is based on Japanese Patent Application No. 347695/1998 filed on Dec. 8, 1998 and No. 347696/1998 filed on Dec. 8, 1998, the contents of which are incorporated herein by reference.

FIELD OF THE INVENTION

The present invention relates to a method and an apparatus for inputting three-dimensional data that determines the shape of an object by irradiating a detection light beam toward the object so as to scan the object.

DESCRIPTION OF THE PRIOR ART

An apparatus for inputting three-dimensional data, which is a non-contact type and enables rapid measurement compared with a contact type, is used for data input into a CG system or a CAD system, physical measurement, visual sense of a robot or other applications.

A slit light projection method (also referred to as a light cutting method) is known as a measurement method suitable for the three dimensional configuration measuring apparatus. By this method, a distance image (three-dimensional image) can be obtained by scanning an object optically. The method is one of active measurement methods for taking an image of an object by irradiating a specific detection light beam (reference light beam). The distance image is a set of pixels that indicate three-dimensional positions of plural parts of the object. In the slit light projection method, a slit light beam having a slit-like section of the irradiated light beam is used as the detection light beam. At a certain time point in the scanning, a part of the object is irradiated and an emission line that is curved corresponding to ups and downs of the irradiated part appears on the image sensing surface. Therefore, a group of data (three-dimensional input data) that determine the shape of the object can be obtained by periodically sampling intensity of each pixel of the image sensing surface in the scanning.

In the conventional method, the position of the object is calculated by triangulation from incident angle of the slit light beam reflected by the object and entering the image sensing surface, irradiation angle of the slit light beam, and length of the base line (distance between a starting point of the irradiation and a light receiving reference point), after determining the incident angle of the slit light beam in accordance with the position of the emission line in the image sensing surface. Namely, the position is calculated in accordance with the irradiation direction and the receiving direction of the detection light beam. The position of the object is calculated from the irradiation direction and the receiving direction in the case where the detection light beam, is a spot light beam (a light beam having a spot-like section) as shown in Japanese Unexamined Patent Application No. 10-2722.

The conventional method has so me disadvantages. Since the accuracy of the three-dimensional input data depends on the precision of the irradiation angle control of the detection light beam, the sufficient accuracy of the three-dimensional input data cannot be obtained. In order to maintain the accuracy, expensive components or much effort for adjusting the position of the irradiation system are necessary. It is difficult to secure the accuracy since the irradiation system has a movable mechanism for deflecting the detection light beam and the mechanism is easy to be affected by variation of operation environment such as temperature or humidity.

SUMMARY OF THE INVENTION

The object of the present invention is to realize three-dimensional data input without using information of the irradiation angle of a detection light beam so as to enable obtaining three-dimensional input data with high accuracy that does not depend on the precision of irradiation angle control, and to improve convenience by employing plural operation modes.

According to a preferred embodiment of the present invention, the method includes the step of irradiating a detection light beam toward an object, the step of sensing images of the object at a first position and a second position that is apart from the first position, the first calculation step of detecting reception angles of the detection light beam reflected by the object at the first and the second positions in accordance with the obtained image data, and calculating the position information of a predetermined part of the object in accordance with the detected first and second reception angles and the distance between the first position and the second position, the second calculation step of detecting the irradiation angle and the reception angle at the first position in accordance with the irradiation angle data of the detection light beam and the image data of the first position, and calculating the position information of a predetermined part of the object in accordance with the detected irradiation angle and the reception angle, and the step of obtaining the position information of a predetermined part of the object by one of the first and the second calculation steps.

According to another preferred embodiment of the present invention, the apparatus has a first mode and a second mode. In the first mode, images of an object are taken from two view points being apart from each other. The position of the object is calculated with high accuracy in accordance with the distance between the view points and the directions from each view point to the irradiated part on the object (the tilt with respect to the line connecting the view points) by triangulation. The calculated data or the data for calculation is output. In the second mode, the position of a part of the object is calculated in accordance with the irradiation angle and the reception angle in the same way as the conventional method of triangulation. In the first mode that does not use the irradiation angle information for calculating the position, it is necessary to memorize data up to the number of sampling points of the object multiplied by the number of view points, so more data should be handled than in the second mode that uses the irradiation angle information. Therefore, in the case where high accuracy is not required, the second mode using the irradiation angle information may be selected so that the load of data transmission and record can be reduced.

BRIEF DESCRIPTION OF THE DRAWINGS

FIG. 2 is a schematic diagram of the irradiation.

FIGS. 3A and 3B are diagrams for explaining how to generate the distance data in a high accuracy mode.

FIG. 4 shows a parallax in taking an image.

FIG. 6 is a block diagram of the memory circuit according to a second example.

FIG. 8 is a block diagram of the memory circuit according to a third example.

FIGS. 10A and 10B are diagrams for explaining how to generate the distance data in a normal mode.

FIGS. 12A–12D are diagrams showing an example of setting the relative position between the light irradiation and the light reception.

FIG. 13 is a functional block diagram of the apparatus for inputting three-dimensional data according to a second embodiment of the present invention.

FIG. 20 is a functional block diagram of the apparatus for inputting three-dimensional data according to a fourth embodiment of the present invention.

FIG. 21 is a functional block diagram of the apparatus for inputting three-dimensional data according to a fourth embodiment of the present invention.

DESCRIPTION OF THE PREFERRED EMBODIMENTS

First Embodiment

Figure 1:
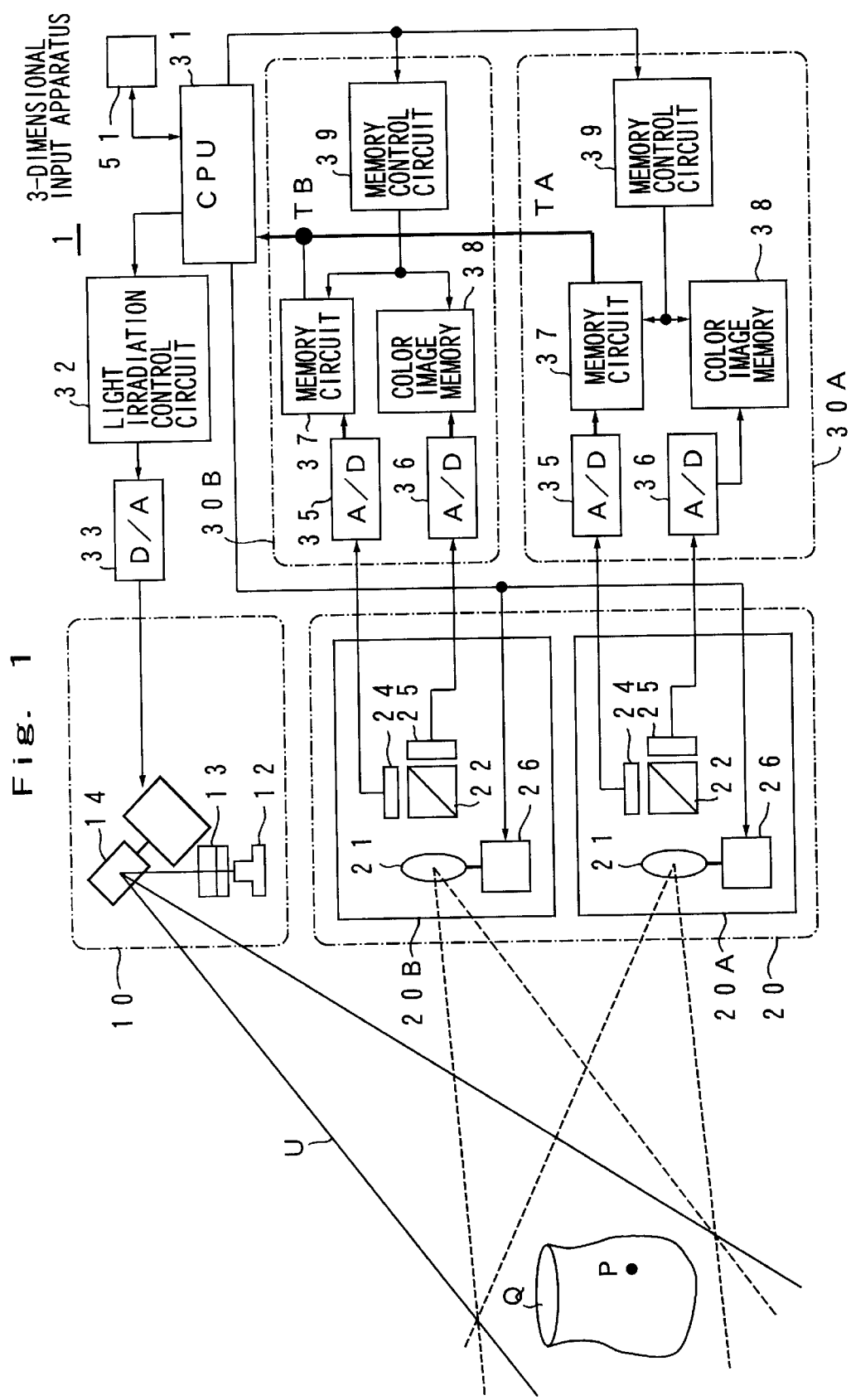
FIG. 1 is a functional block diagram of the apparatus for inputting three-dimensional data according to a first embodiment of the present invention.

FIG. 1 is a functional block diagram of a three-dimensional data input apparatus 1 according to a first embodiment of the present invention.

The three-dimensional data input apparatus 1 includes an irradiation system 10 that irradiates a slit light beam U, a light reception system 20 including two image sensing systems 20A, 20B having the same configuration with each other, and two received light signal processors 30A, 30B having the same configuration with each other.

The irradiation system 10 includes a semiconductor laser 12 as a light source, a group of lenses 13 for beam shaping and a galvanomirror 14 as a beam deflecting means for changing the irradiation angle. The group of lenses 13 includes a collimator lens and a cylindrical lens. The galvanomirror 14 is given a deflection control signal by a light irradiation control circuit 32 via a digital-to-analog converter 33.

Each of the image sensing systems 20A and 20B includes a light receiving lens 21, a beam splitter 22, an image sensor 24 for obtaining a distance image representing a shape of an object Q, a color image sensor 25 for getting a two-dimensional image for monitoring and a lens drive mechanism 26 that enables zooming and focusing functions of the lens 21. The beam splitter 22 separates light within a light emission wavelength range of the semiconductor laser 12 (e.g., the center wavelength is 670 nm) from visible light. The image sensor 24 and the color image sensor 25 are two-dimensional imaging device (an area sensor). For example, a CCD sensor or a CMOS sensor can be used as the image sensor 24. The output of the image sensor 24 is converted into received light data having a predetermined number of bits by an analog-digital converter 35, and is sent to a memory circuit 37 in sequence. The memory circuit 37 memorizes data (TA, TB) indicating irradiation angles θA, θB explained below in accordance with the value of the received light data. The output of the color image sensor 25 is converted into received light data by an analog-digital converter 36 and is memorized in a color image memory 38 in sequence. Address assignment of the memory circuit 37 and the color image memory 38 is performed by a memory control circuit 39.

The CPU 31 that controls the three-dimensional data input apparatus 1 instructs control targets properly and reads data from either memory circuit 37 included in the received light signal processor 30A or 30B, or from the memory circuits 37 in both received light signal processors 30A and 30B so as to perform the operation of obtaining the distance data. The distance data are output to external equipment (not shown) as three-dimensional input data on proper timing. On this occasion, a two-dimensional color image that is memorized by the color image memory 38 of at least one of the received light signal processors 30A and 30B is also output. The external equipment includes a computer, a display and a memory device.

The three-dimensional data input apparatus 1 has two modes, which are a first mode (referred to as a high accuracy mode) that obtains the distance data using two reception angles of two locations without using the irradiation angle, and a second mode (referred to as a normal mode) that obtains the distance data using an irradiation angle and the reception angle of one location. The CPU 31 detects the designated mode when a mode designation portion 51 decides the state. The mode designation portion 51 can be an operation panel, a dip switch provided independently of the operation panel, or an interface for remote control.

For the operation in the normal mode, each output of the two image sensing systems 20A, 20B can be used. However, the three-dimensional data input apparatus 1 uses the output of the image sensing system 20A that is disposed at farther position from the irradiation system 10. Thus, the base line length L' (see FIG. 10B) becomes longer compared with the case where the output of the image sensing system 20B is used that is disposed at closer position to the irradiation system 10, so that the accuracy of the triangulation is increased.

FIG. 2 is a schematic diagram of the irradiation. FIGS. 3A and 3B are diagrams for explaining how to generate the distance data in a high accuracy mode. FIG. 4 shows a parallax in taking an image.

The three-dimensional data input, apparatus 1 irradiates the slit light beam U so as to scan the imaginary plane VS from a starting point C on a reflecting surface of the galvanomirror 14. The imaginary plane VS corresponds to a section perpendicular to the depth direction of a space (a range within the angle of view) whose image can be taken by the image sensor 24. The range corresponding to each pixel g of the image sensor 24 out of the imaginary plane VS becomes a sampling section of three-dimensional data input. In FIG. 2, the starting point C of light irradiation and the view points (principal point of light reception) A, B are aligned. The view points A, B are arranged in the vertical direction, and the longitudinal direction of the slit light beam U is regarded as the horizontal direction.

The following explanation is about three-dimensional data input of the object.

The deflection angle of the galvanomirror 14 is controlled in synchronization with image sensing by the two image sensors 24 in the frame period. The two image sensors 24 are driven by the same timing. In other words, the object Q is imaged from the view points A, B simultaneously. It is detected which timing of irradiation of the slit light beam U deflected in sequence each pixel of the image sensor 24 was irradiated.

Noting the pixel $g_{iAjA}$ that is the iA-th in the horizontal direction and the jA-th in the vertical direction of the image sensor 24 of one image sensing system 20A, the output thereof becomes the maximum when the slit light beam U passes the point P on the line of sight corresponding to the pixel $g_{iAjA}$. Noting the output of the image sensor 24 of the other image sensing system 20B, the output of the pixel $g_{iAjA}$ corresponding to the line of sight passing the point P becomes the maximum. Supposing that "epipola" restriction in the vertical direction is established in the first image taken by the image sensing system 20Aa and the second image taken by the image sensing system 20Ba, the position iB of the pixel $g_{iAjA}$ in the horizontal direction is determined uniquely to the position iA of the pixel $g_{iAja}$ in the horizontal direction. The position jB of the pixel $g_{iAjA}$ in the vertical direction to the position jA of the pixel $g_{iAjA}$ in the vertical direction is determined by detecting the pixel whose output became the maximum at the same time when the output of the pixel $g_{iAjA}$ in the pixel array of the horizontal direction position iB in the second image became the maximum. Therefore, the pixel in the second image corresponding to each pixel in the first image can be found by determining time points (time points of peak intensity) $TA_{iAjA}$, $TB_{iAjA}$ when the output of each pixel of the image sensor 24 of the image sensing systems 20A, 20B becomes the maximum.

If the point P corresponds to the pixel $g_{iAjA}$ of the first image, the point P exists on the line that is defined by the light reception angle $\theta A_{iAjA}$ determined by the position of the pixel $g_{iAjA}$ and the space coordinates of the view point A. In the same way, if the point P corresponds to the pixel $g_{iAjA}$ of the second image, the point P exists on the line that is defined by the light reception angle $\theta B_{iAjA}$ determined by the position of the pixel $g_{iAjA}$ and the space coordinates of the view point B. Namely, the cross point of these two lines is the point P. Therefore, the distance $D_{iAjA}$ between the base line passing the view points A, B and the point P in the depth direction can be calculated in accordance with the light reception angles $\theta A_{iAjA}$, $\theta B_{iAjA}$ and the distance L between the view points, applying the principle of triangulation. Thus, the relative position between the view points A, B and the point P can be specified. The above-mentioned process is performed for each pixel g of the first image, so that information of three-dimensional position of the object Q for the number of pixels can be obtained.

The following explanation is about a concrete configuration of the circuit for detecting the time point of peak intensity. In the explanation, the suffixes iAjA, iBjB indicating the pixel positions are omitted except the case where discrimination of pixel positions is required.

Figure 5:
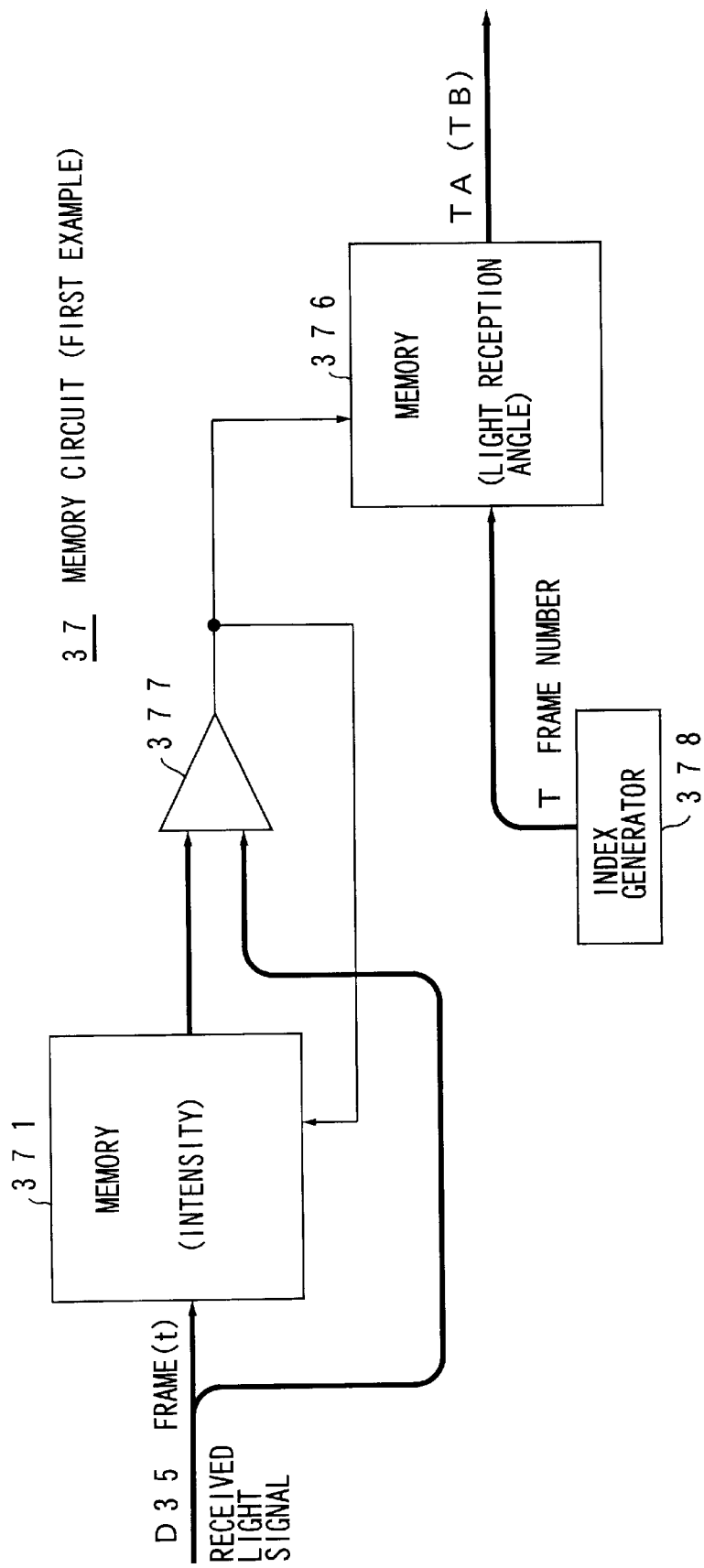
FIG. 5 is a block diagram of the memory circuit according to a first example.

FIG. 5 is a block diagram of a first example of the memory circuit.

The memory circuit 37 includes two memories 371, 376, a comparator 377 and an index generator 378.

The memory 371 receives the received light data D35 from the analog-digital converter 35, while the memory 376 receives a frame number T from the index generator 378. The comparator 377 compares for each pixel of the image sensor 24, the received light data D35 of the t-th frame that are the latest input data with the received light data D35 that were written into the memory 371 before, and permits writing into the memories 371, 376 if the latest received light data D35 is larger than the former received light data D35. Then, each of the memories 371, 376 is overwritten by the latest input data. If the result of the comparison is the opposite, each of the memories 371, 376 sustains the memorized data. Therefore, after completion of the scanning, the memory 371 memorizes the maximum value of the received light data D35 for each pixel g, and the memory 376 memorizes the number T of the frame in which the received light data D35 became the maximum for each pixel. Since the image sensing of each frame is performed in a constant period, the frame number T represents the time point in the scanning period (lapse from the start of scanning). In other words, the frame number T memorized in the memory 376 corresponds to the above-mentioned time points $TA_{iAjA}$ and $TB_{iBjB}$, which is information specifying the irradiation angles $\theta A_{iAjA}$ and $\theta B_{iBjB}$.

According to this example, the time points of peak intensity $TA_{iAjA}$ and $TB_{iBjB}$ can be detected by the simple circuit. However, the resolution of detection for the irradiation angle depends on the pixel pitch of the image sensor 24. A second example that improves the resolution will be explained as the following.

Figure 7B:
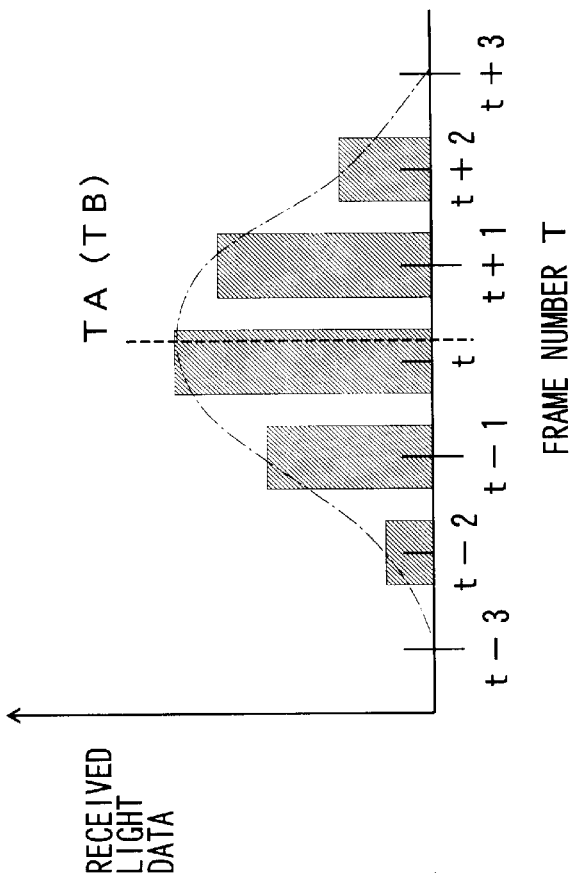
FIGS. 7A and 7B show the relationship between the distribution of intensity and the received light data on the image sensing surface.
Figure 7A:
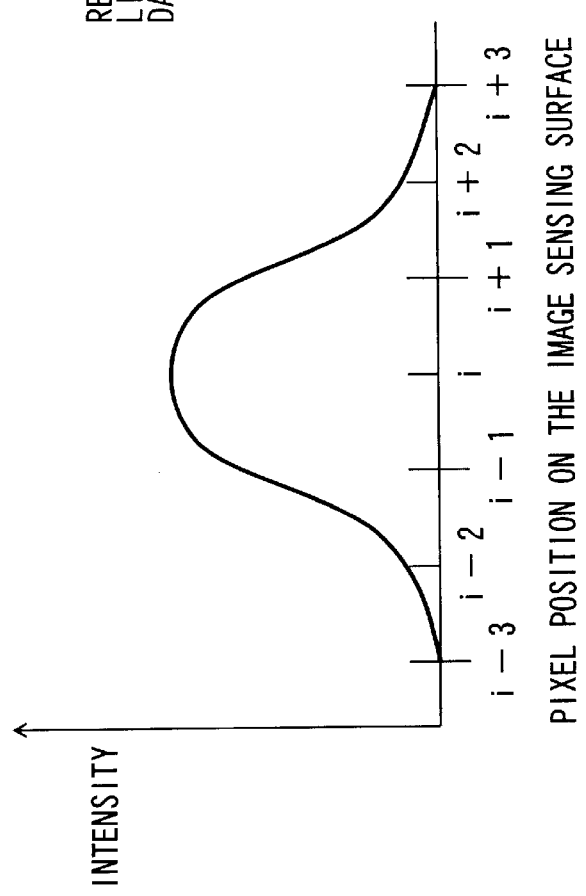

FIG. 6 is a block diagram of the memory circuit according to the second example. FIGS. 7A and 7B show the relationship between the distribution of intensity and the received light data on the image sensing surface. In FIG. 6, the element corresponding to that shown in FIG. 5 is denoted by the same numerals as in FIG. 4.

The memory circuit 37b of the second example includes four memories 372, 373, 374, 375 having the same size as the memory 371, adding to the memory 371. The four single-frame delay memories 379a–379d are used for delaying data input of each of the memories 372–375 one by one frame with respect to that of the memory 371. Namely, the memory circuit 37b memorizes five frames of the received light data D35 simultaneously that are sequential for each pixel g. The comparator 377 compares the input and the output of the third memory 373 whose input is delayed by two frames. If the input data value of the memory 373 is larger than the output data value thereof (data value written before), writing into the memories 371–375 and the memory 376 is permitted.

At the end of each scanning, the memory 373 memorizes the maximum value of the received light data D35 for each pixel g. In addition, the memories 371, 372, 374, 375 memorize the received light data D35 of four frames, which are two frames before the frame in which the received light data D35 became the maximum, one frame before the frame, one frame after the frame and two frames after the frame. The memory 376 memorizes the number T of the frame in which the received light data D35 became the maximum for each pixel g.

As shown in FIG. 7A, it is supposed that the width of image of the slit light beam which is imaged on the image sensing surface corresponds to 5 pixels, and the distribution of intensity is like a mountain having a single peak. In this case, one pixel g is noted to obtain the received light data which vary in accordance with the distribution of intensity as shown in FIG. 7B. Therefore, barycenter calculation is performed in accordance with the received light data D35 of the five frames memorized in the memory 371–375, so that the time points TA, TB can be calculated in finer pitch than the frame period (i.e., the pixel pitch). In the example shown in FIG. 7B, the time point TA (TB) is located between the t-th sampling time point and the (t+1)th sampling time point.

The second example has an advantage in that the resolution is improved, but has a disadvantage in that a desired accuracy cannot be obtained depending on the distribution of intensity. Namely, certain noises are added to in the actual image sensing, due to characteristics of the optical system or other factors. Therefore, the distribution of intensity may have plural peaks or may have a flat without any clear peak. If the distribution of intensity gets largely out of an ideal shape, the reliability of the barycenter calculation may drop.

The influence of such noises can be reduced by performing the barycenter calculation in accordance with the distribution of intensity in a sufficiently long period rather than the short period having the frame in which the maximum value of the intensity is obtained and a few frames before and after the frame. A third example for realizing this method will be explained below.

Figure 9:
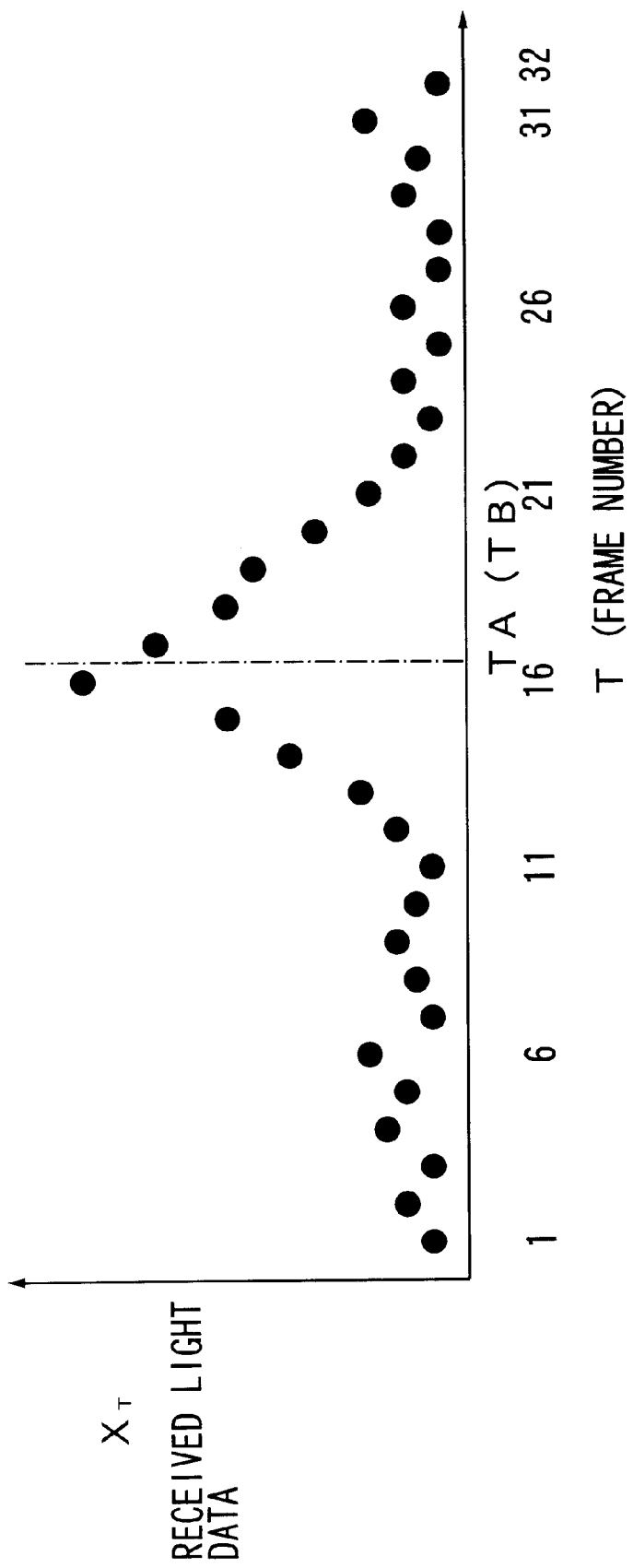
FIG. 9 is a diagram showing concept of the barycenter in accordance with FIG. 8.

FIG. 8 is a block diagram of the memory circuit according to the third example. FIG. 9 is a diagram showing concept of the barycenter in accordance with FIG. 8.

The memory circuit 37c of the third example includes a memory 3710, a static light data memory 3720, a subtractor 3730, a first adder 3740, a second adder 3750, and a divider 3760. The barycenter (time barycenter) is calculated in accordance with the received light data D35 of the plural frames for each pixel g.

The memory 3710 memorizes the received light data D35 of k frames, which were obtained by scanning the object Q. The received light data value of the T-th (T=1 to k) frame of each pixel g is denoted by $x_T$. The static light data memory 3720 memorizes the static light data that represent undesired incident light quantity except the slit light beam U. The static light data are calculated in accordance with the received light data D35 when the slit light beam U does not enter. The value s may be a predetermined fixed value, or can be derived from the received light data D35 in real time. The fixed value may be five, six or ten if the received light data D35 are 8-bit data (256 gradations). The subtractor 3730 subtracts the value s of the static light data from the value $x_T$ of the received light data D35 that were read out of the memory 3710. Then, the value of the output data of the subtractor 3730 is newly assigned to $X_T$. The first adder 3740 multiplies the value $X_T$ of each of the k received light data D35 and the corresponding frame number T for each pixel g, so as to output the sum of the multiplied results. The second adder 3750 outputs the sum of the values $X_T$ of the k received light data D35 for each pixel g. The divider 3760 divides the output value of the first adder 3740 by the output value of the second adder 3750, so as to output the obtained barycenter as the time point TA (or TB).

FIGS. 10A and 10B are diagrams for explaining how to generate the distance data in a normal mode.

In the normal mode, the deflection angle of the galvanomirror 14 is controlled in synchronization with taking image by the image sensor 24 of one image sensing system 20A in the frame period. In the same way as in the high accuracy mode, it is detected which timing of irradiation of the slit light beam U deflected in sequence each pixel of the image sensor 24 was irradiated. Noting the pixel $g_{iAjA}$ that is located on the i-th column and j-th row in the image sensor 24, the output thereof becomes the maximum when the slit light beam U passes the point P on the line of sight corresponding to the pixel $g_{iAjA}$. The irradiation angle (the deflection angle) $\theta C_{iAjA}$ at the time when the output of the pixel $g_{iAjA}$ became the maximum can be derived from the elapsed time (the number of frames) from deflection start to the time, and the unit deflection angle (the step angle). When the point P on the object Q corresponds to the pixel $g_{iAjA}$ of the first image, the point P exists on the line defined by the reception angle $\theta A_{iAjA}$ depending on the position of the pixel $g_{iAjA}$ and by the space coordinates of the view point A. The P also exists on the plane defined by the irradiation angle $\theta C_{iAjA}$ and the space coordinates of the starting point C. The cross point of this plane and the above-mentioned line is the point P. Therefore, the distance $D'_{iAjA}$ between the base line passing the view points A and the point P in the depth direction can be calculated in accordance with the light reception angle $\theta A_{iAjA}$, the irradiation angle $\theta C_{iAjA}$ and the base line length L', applying the principle of triangulation. Thus, the relative position between the view points A and the point P can be specified. The above-mentioned process is performed for each pixel g of the first image, so that information of three-dimensional position of the object Q for the number of pixels can be obtained. In the normal mode too, the resolution of the three-dimensional data input can be increased by performing the barycenter calculation in accordance with the obtained data, using the circuit shown in FIG. 6 or 8.

Figure 11:
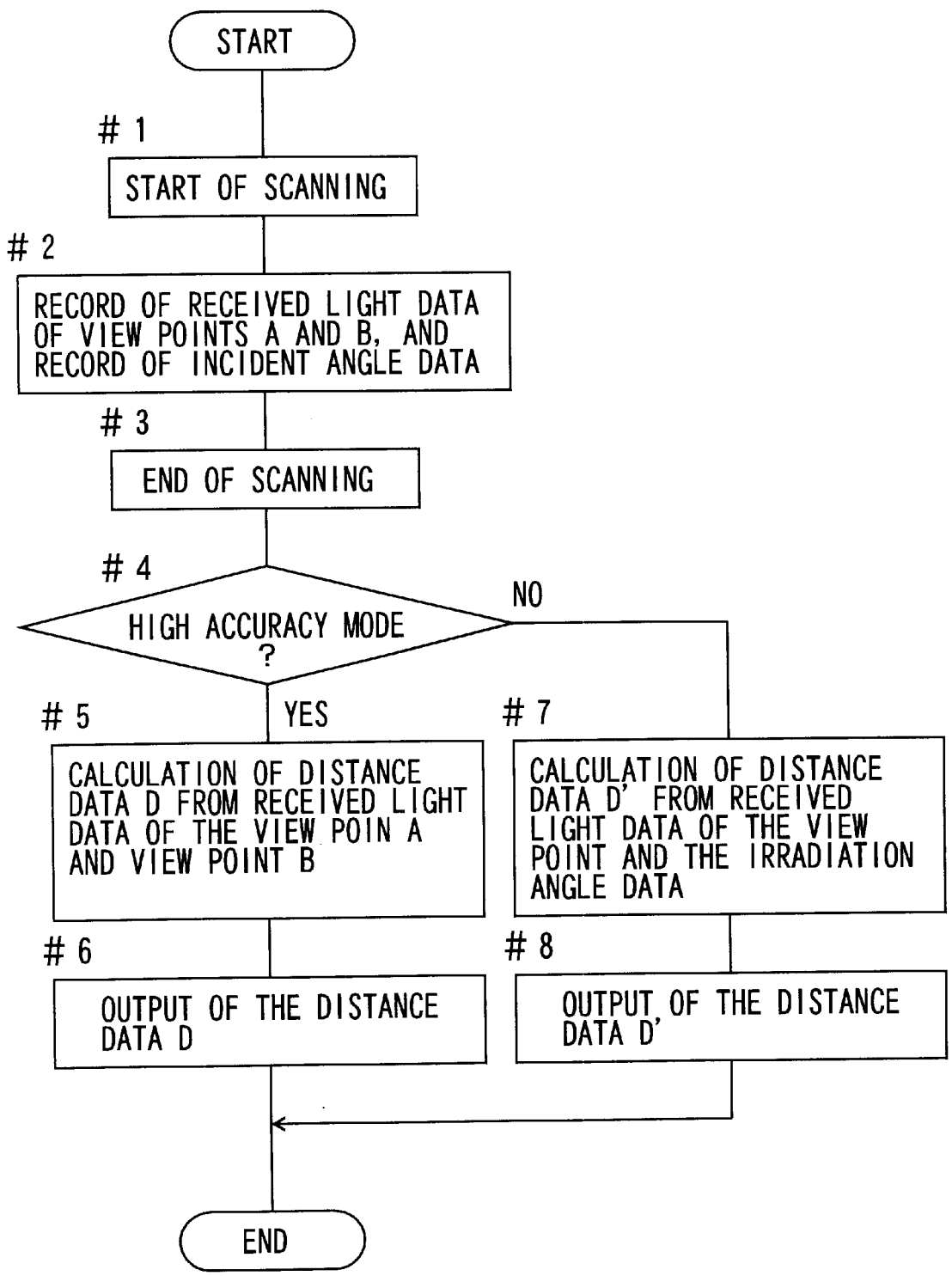
FIG. 11 is a flowchart of a general operation of the apparatus for inputting three-dimensional data.

FIG. 11 is a flowchart of a general operation of the three-dimensional data input apparatus 1.

The semiconductor laser 12 and the galvanomirror 14 are turned on to start scanning (Step #1). The received light data obtained by taking an image from the view points A and B are recorded and irradiation angle data indicating the irradiation angle for each frame are recorded (Step #2). When the scanning is finished (Step #3), the following output process is performed in accordance with the mode. This output process means data transmission toward external equipment or recording (data accumulation) into the memory of the apparatus. In the case of the high accuracy mode, the received light data of the view points A and B is used for calculating and outputting the distance data D (Steps #4–#6). On this occasion, the received light data of the view points A and B are also output if necessary. In the case of the normal mode, the received light data and the irradiation angle data of the view point A are used for calculating and outputting the distance data D' (Step #4, #7, #8). The received light data and the irradiation angle data are also output if necessary.

FIGS. 12A–12D are diagrams showing an example of setting the relative position between the light irradiation and the light reception.

Concerning the arrangement of the irradiation system 10 and the light reception system 20, it is not always necessary that the starting point C of the light irradiation and the principal point of the light reception (view point) A, B. are aligned as shown in FIG. 12A or FIG. 12B. For example, the arrangement shown in FIG. 12C in which the three points A, B, C are arranged in L shape viewed from the object side or the arrangement shown in FIG. 12D in which the three points A, B, C are arranged in T shape can be adopted. Especially, if the starting point C is disposed between the view point A and the view point B as shown in FIG. 12B or FIG. 12D, an occlusion due to the difference between the position of the view point A or B and the starting point C can be reduced. In this case, it is desirable that the distance d between the starting point C of light irradiation and the view point A is identical to that between the starting point C an d the view point B. In order to raise the accuracy of the high accuracy mode as well as the normal mode, it is desirable that the distance between the view points A and B is large, and that the distance between the starting point C of light irradiation and the view point A is also large as shown in FIG. 12C.

Second Embodiment

FIG. 13 is a functional block diagram of a three-dimensional data input apparatus 1B according to a second embodiment of the present invention. In FIG. 13, the element denoted by the same numerals as in FIG. 1 has the same function as the above-mentioned three-dimensional data input apparatus 1.

The second embodiment does not use a slit light beam but uses a spot light beam V having a spot-like section for image sensing by a one-dimensional image sensor (a linear sensor) 27.

The three-dimensional data input apparatus 1B includes an irradiation system 10b, a light reception system 20b including two image sensing systems 20Ab, 20Bb having the same configuration with each other, and two received light signal processors 30Ab, 30Bb having the same configuration with each other. The three-dimensional data input apparatus 1B is controlled by the CPU 31b. The irradiation system 10b includes a semiconductor laser 12, a collimator lens 13b and a galvanomirror 14b.

Each of the image sensing systems 20Ab and 20Bb includes a light receiving lens 21, a lens drive mechanism 26, an infrared cut filter F1, a band-pass filter F2, a filter switching mechanism 28 and an image sensor 27 used for three-dimensional data input and monitor image sensing. The image sensor 27 is a three-line CCD sensor having pixel arrays corresponding to each of red, green and blue colors. The infrared cut filter F1 is used for monitor image sensing. The band-pass filter F2 that passes light having a wavelength within the laser wavelength band is used for three-dimensional data input, so that only the output of the red pixel array of the image sensor 27 is used as light receiving information.

In addition, in the case where the spot light beam V is used, the position of the point P on the object Q can be calculated by detecting the time points TA, TB. The explanation of the principle is omitted since it is the same as that when using the slit light beam U.

Figure 14A:
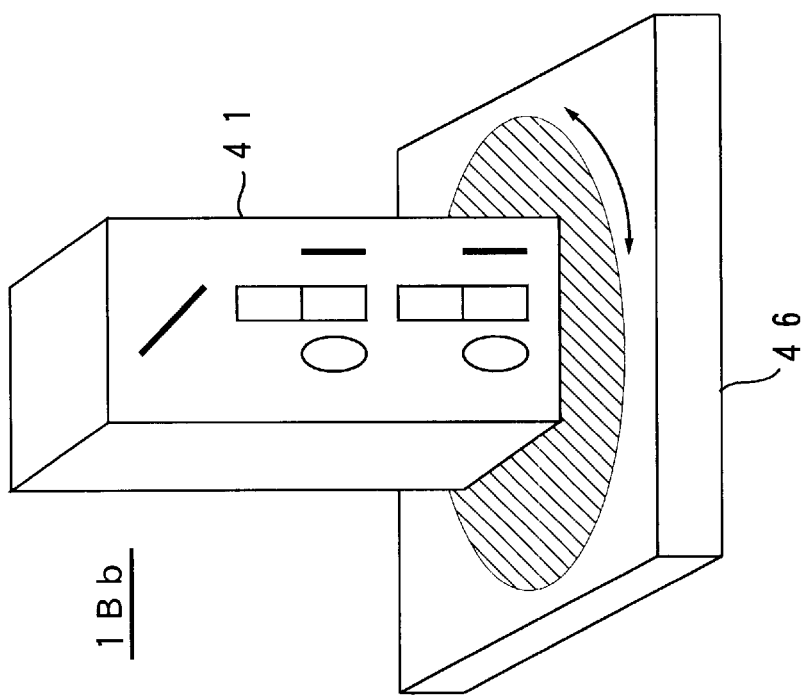
FIGS. 14A and 14B are diagrams of configurations of the apparatus that realizes 360 degrees input or all orientation input by rotation.
Figure 14B:
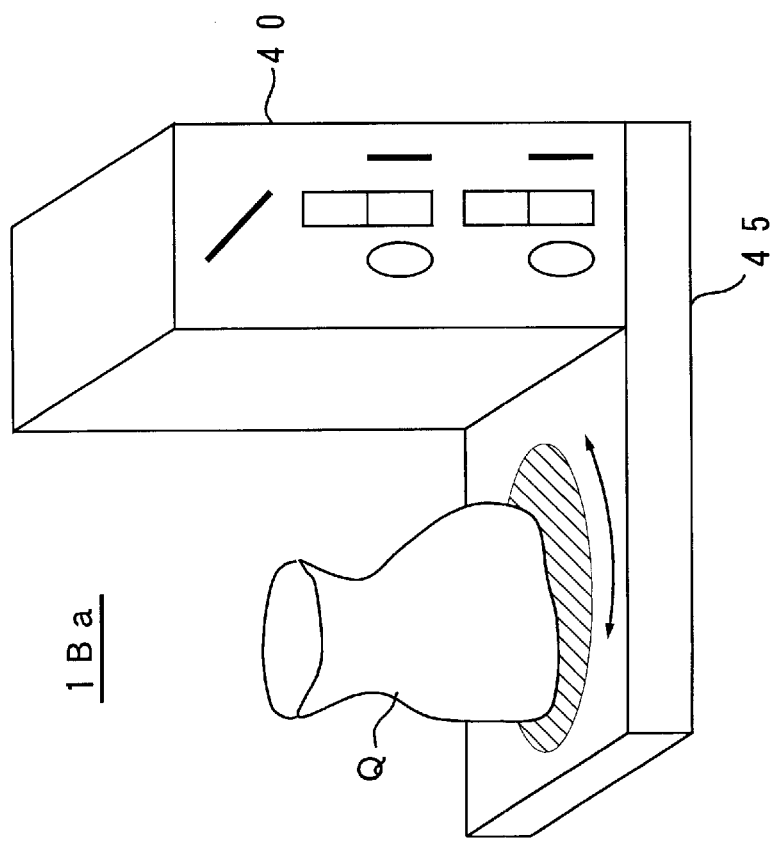

FIGS. 14A and 14B are diagrams of a configuration of the apparatus that realizes 360 degree input or all orientation input by rotation.

The three-dimensional data input apparatus shown in FIG. 14A includes an optical system 40 for irradiating a light beam and image sensing, and a turntable 45 for carrying the object Q and rotating, so as to realize the 360 degree input. The optical system 40 is structured to switch the filter so as to perform three-dimensional data input and color image sensing by a single image sensor. The turntable 45 rotates by predetermined angles after the object Q is scanned from a certain direction to get the barycenter. The scanning by the optical system 40 and the rotation of the turntable 45 are repeated N times, so that the three-dimensional data input is performed for the outer surface of the object Q up to 360 degrees. The optical system 40 includes a memory having a capacity for memorizing data of N times. The direction component can be determined as n×θ since it is data of n-th scanning. Thus, the three-dimensional position data in the space of the object to be measured can be obtained. Another configuration is possible in which the object Q stays and the optical system 40 turns around the object Q.

In the three-dimensional data input apparatus 1Bb shown in FIG. 14B, the Optical system 41 is attached to the upper portion of the turntable 46. Using this three-dimensional data input apparatus 1Bb, all orientation three-dimensional data input can be performed for the inner wall of the object having a cavity, by the similar operation to the three-dimensional data input apparatus 1Ba.

Third Embodiment

Figure 15:
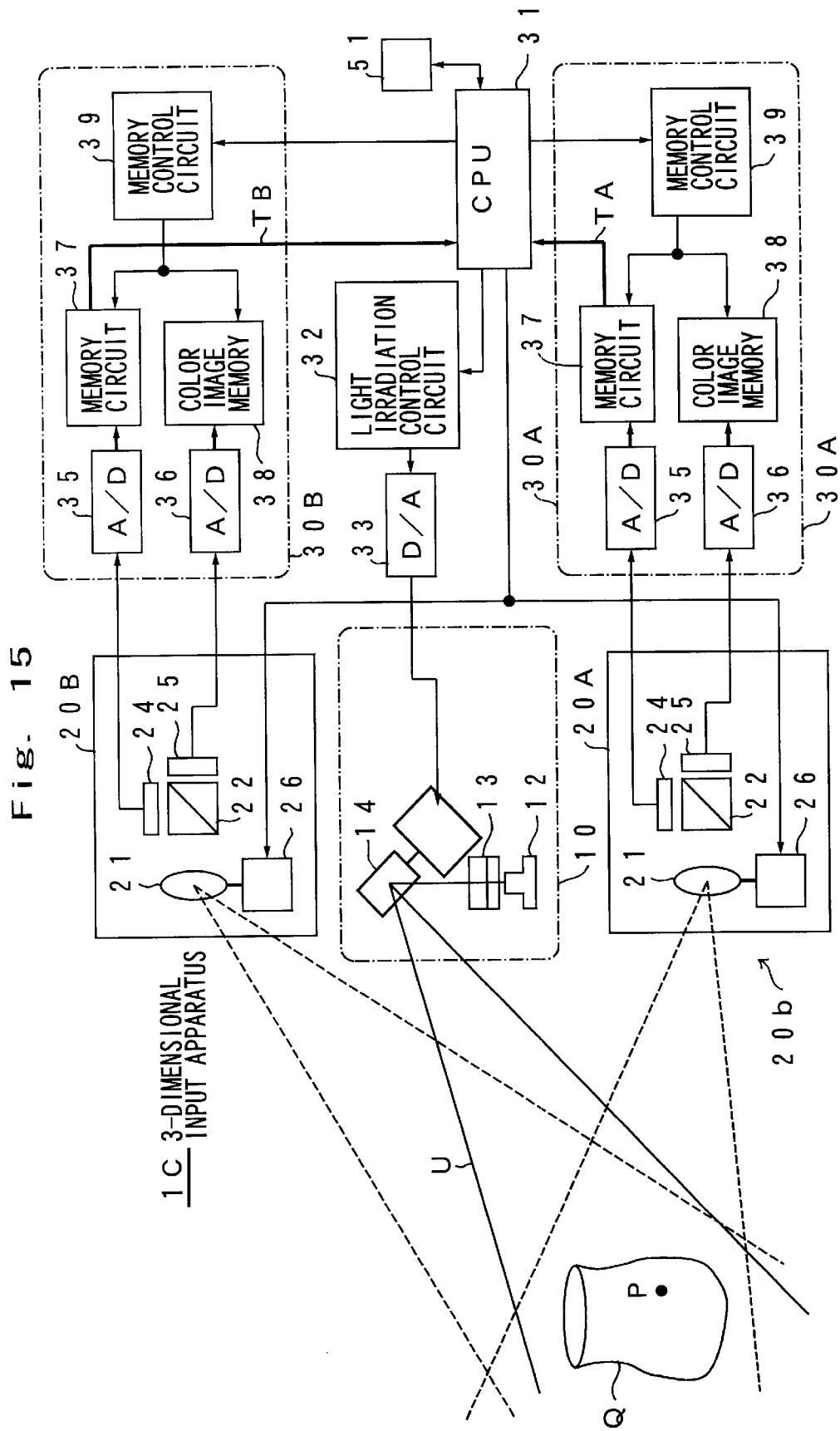
FIG. 15 is a functional block diagram of the apparatus for inputting three-dimensional data according to a second embodiment of the present invention.

FIG. 15 is a functional block diagram of a three-dimensional data input apparatus 1C according to a third embodiment of the present invention.

In the three-dimensional data input apparatus 1C of the third embodiment, location of the irradiation system 10 and two image sensing systems 20A, 20B is different from that of the first embodiment shown in FIG. 1. The two image sensing systems 20A and 20B are located at the neighboring positions in the first embodiment, while the irradiation system 10 is located midway between the two image sensing systems 20A and 20B in the third embodiment.

Other basic configuration of the three-dimensional data input apparatus 1C of the third embodiment is the same as that of the first embodiment, so the same element is denoted by the same reference numeral and the explanation thereof is omitted. The process of the third embodiment is similar to that of the first embodiment except the following difference.

The three-dimensional data input apparatus 1C has two modes for generating the output data in the same way as the above-mentioned three-dimensional data input apparatus 1. However, the three-dimensional data input apparatus 1C performs supplementation of the distance data in the first mode.

Namely, in the first mode, the distance data are derived from the reception angle information of two points, and insufficient distance data is supplemented using the irradiation angle information. The supplementation of the distance data is not performed in the second mode. Hereinafter, the first mode is referred to as data supplementation mode, and the second mode is referred to as a normal mode. These modes are selected in accordance with the use of the output data. For example, if it is desired to sample the positions substantially uniformly over the entire visible area of the object, the data supplementation is better since dropouts of data can be reduced by the supplementation. However, the distance between one of the view points (the principal point of the light reception) and the starting point of light irradiation related to the supplementation is smaller than the distance between two view points, so the accuracy of the distance data to be supplemented is smaller than that of the normal distance data by the amount of decrease of the base line length in the triangulation. Therefore, the normal mode is suitable if it is desired to adjust the accuracy of data about all sampling position when the dropouts of data occur. The output of the image sensing system 20A is used for calculation of data supplementation. However, the output of the image sensing system 20B can be used instead of the image sensing system 20A. Alternatively, the outputs of the image sensing systems 20A and 20B can be combined with the irradiation angle data for calculating the supplement data.

Figure 16:
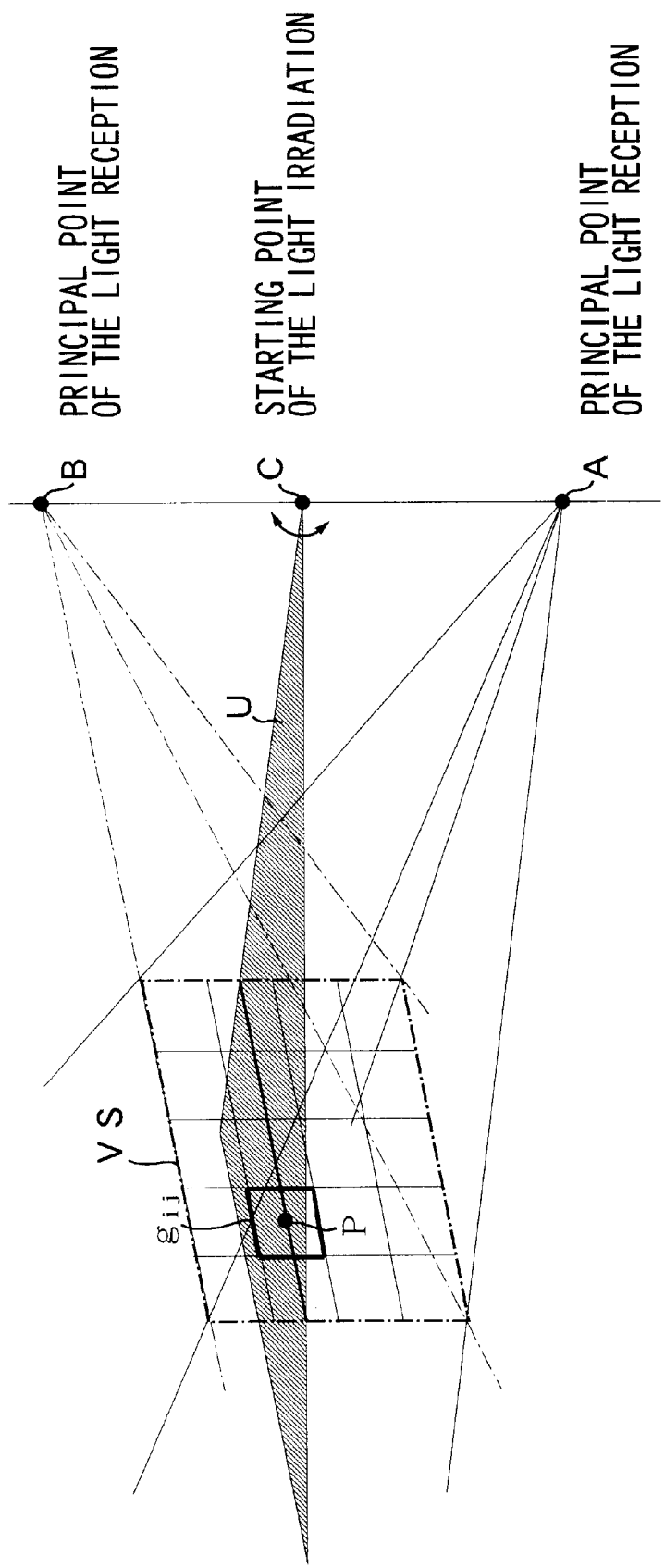
FIG. 16 is a schematic diagram of irradiation according to the third embodiment of the present invention.
Figure 17:
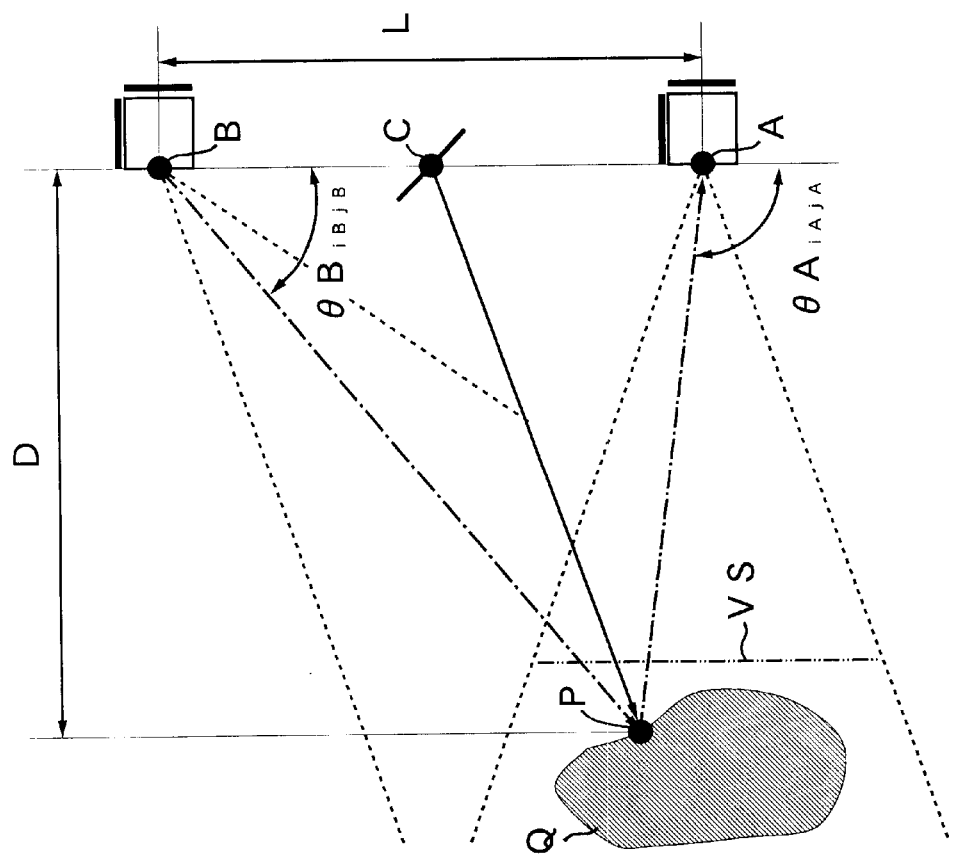
FIG. 17 is a diagram for explaining how to generate the distance data which the irradiation angle is not used.

FIG. 16 is a schematic diagram of the irradiation. FIG. 17 is a diagram for explaining how to generate the distance data that do not depend on the irradiation angle information.

In FIG. 16, the starting point C of light irradiation and the view points (principal points of light reception) A and B are aligned, and the position of the starting point C is midway between the view points A and B.

The three-dimensional data input of the object Q that does not use the irradiation angle information is the same as the three-dimensional data input apparatus 1 of the first embodiment.

Figure 18:
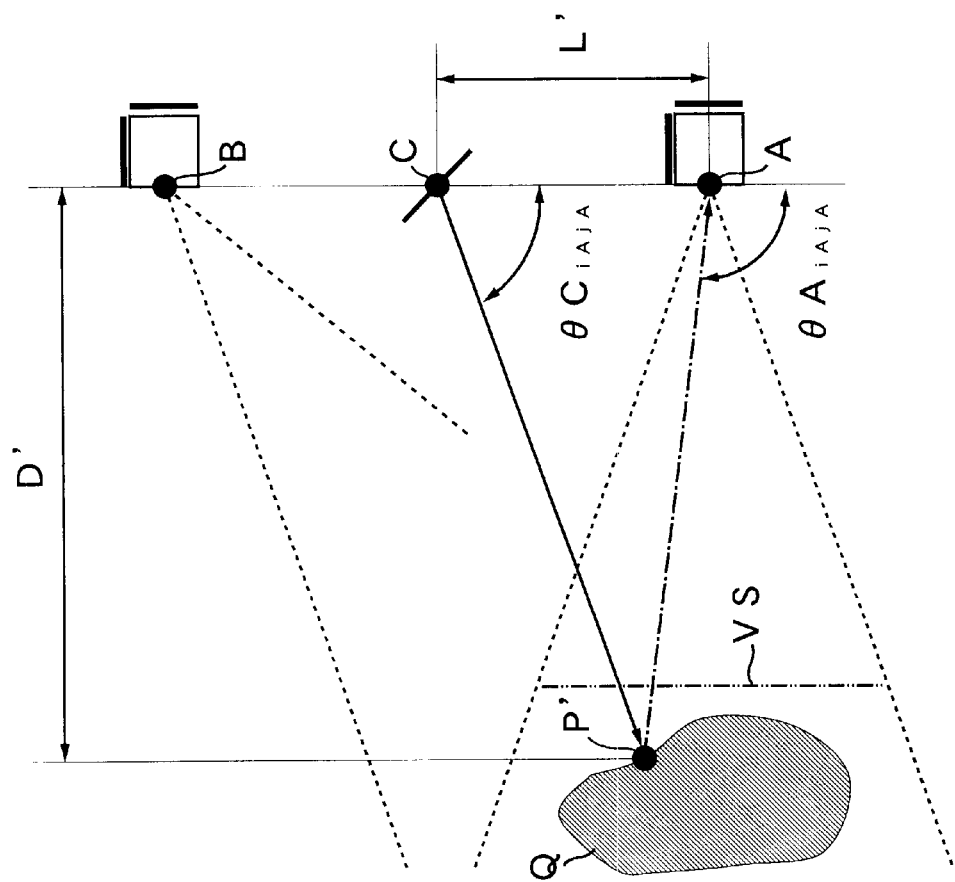
FIG. 18 is a diagram for explaining how to generate the distance data concerning data supplementation.

FIG. 18 is a diagram for explaining how to generate the distance data related to the data supplementation.

In the data supplementation, it is detected which timing of irradiation of the slit light beam U deflected in sequence each pixel of the image sensor 24 of the image sensing system 20A was irradiated. Noting the pixel $g_{iAjA}$ that is located on the i-th column and j-th row in the image sensor 24, the output thereof becomes the maximum when the slit light beam U passes the point P' on the line of sight corresponding to the pixel $g_{iAjA}$. The irradiation angle (the deflection angle) $\theta C_{iAjA}$ at the time when the output of the pixel $g_{iAjA}$ became the maximum can be derived from the elapsed time (the number of frames) from deflection start to the time, and the unit deflection angle (the step angle). When the point P' on the object Q corresponds to the pixel $g_{iAjA}$ of the first image, the point P' exists on the line defined by the reception angle $\theta A_{iAjA}$ depending on the position of the pixel $g_{iAjA}$ and by the space coordinates of the view point A. The P' also exists on the plane defined by the irradiation angle $\theta C_{iAjA}$ and the space coordinates of the starting point C. The cross point of this plane and the above-mentioned line is the point P'. Therefore, the distance D' between the base line passing the view points A and the point P' in the depth direction can be calculated in accordance with the light reception angle $\theta A_{iAjA}$, the irradiation angle $\theta C_{iAjA}$ and the base line length L', applying the principle of triangulation. Thus, the relative position between the view points A and the point P can be specified. The above-mentioned process is performed for each pixel g of the first image, so that information of three-dimensional position (distance image) of the object Q for the number of pixels can be obtained. In the data supplementation mode, among the distance data obtained by the above-mentioned process, data for the pixel whose data could not obtained by the method of FIG. 17 (the pixel corresponding to the part of the object to be supplemented) is used for supplementation. In the data supplementation too, the resolution of the three-dimensional data input can be increased by performing the barycenter calculation in accordance with the obtained data, using the circuit shown in FIG. 6 or 8.

Figure 19:
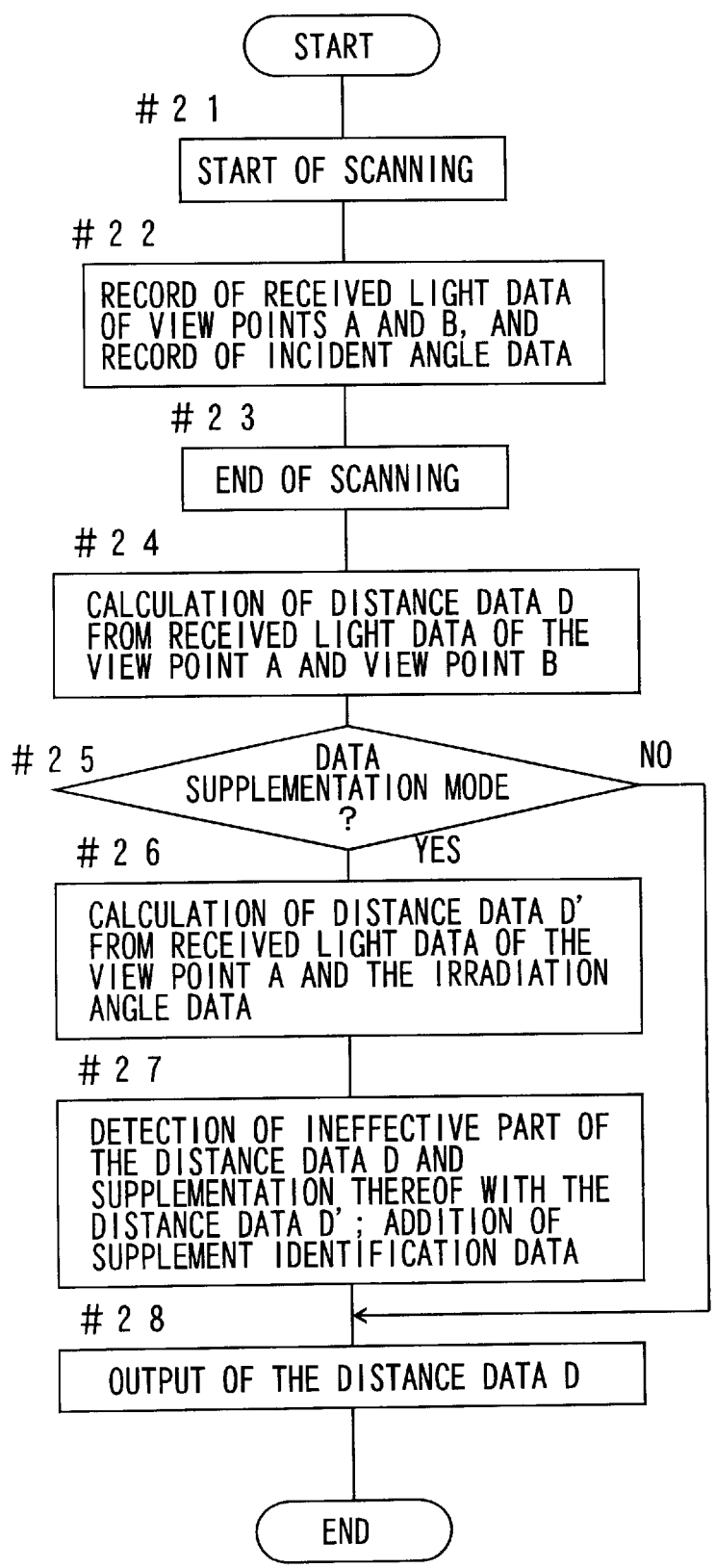
FIG. 19 is a functional block diagram of the apparatus for inputting three-dimensional data according to a third embodiment of the present invention.

FIG. 19 is a flowchart of a general operation of the three-dimensional data input apparatus 1C. FIG. 20 is a schematic diagram of data supplementation.

The semiconductor laser 12 and the galvanomirror 14 are turned on to start scanning (Step #21). The received light data obtained by taking an image from the view points A and B are recorded and irradiation angle data indicating the irradiation angle for each frame are recorded (Step #22). After the scanning is finished, the distance data D are calculated for each pixel of the image sensing surface using the received light data of the view points A and B (Step #23, #24).

In the data supplementation mode, the received light data of the view point A and the irradiation angle data are used first for calculating the distance data D' (Step #25, #26). Then, the ineffective part $G_{NG}$ of the distance data D (pixels to be supplemented) that was obtained before is detected, and the distance data D of the ineffective part $G_{NG}$ is replaced with the distance data D'. On this occasion, an identifier d2 is added to the distance data D' of each pixel of the ineffective part $G_{NG}$ for indicating that the distance data D' is the supplement data (Step #27). Namely, the distance data D' includes the distance d1 and the identifier d2. Thus, when displaying the distance image on the display, discrimination between the normal data and the supplement data becomes easy (e.g., by coloring). It is preferable to add the identification data indicating the view point A related to supplementation for process of data proofreading. Instead of recording, the identifier d2 for each pixel, the pixel address of the ineffective part $G_{NG}$ can be added to the distance data as the identification data for recording.

At last, the output process of the distance data D that was partially supplemented is performed (Step #28). This output process means data transmission toward external equipment or recording (data accumulation) into the memory of the apparatus. In the normal mode. the data supplementation is not performed, but the distance data D that were calculated in Step #24 are output (Step #25, #28).

As an example of setting relative position between irradiation and reception of the light beam, the configuration shown in FIG. 12B or 12D can be adopted, for example.

In the third embodiment too, concerning the arrangement of the irradiation system 10 and the light reception system 20, it is not always necessary that the starting point C of light irradiation and the principal points of light reception (view points) A, B are aligned as shown in FIG. 12B. For example, the arrangement shown in FIG. 12D in which the three points A, B, C are arranged in T shape viewed from the object side can be adopted. If the starting point C is disposed between the view point A and the view point B, an occlusion due to the difference between the position of the view point A or B and the starting point C can be reduced. It is desirable that the distance d between the starting point C of light irradiation and the view point A is identical to that between the starting point C and the view point B.

Fourth Embodiment

FIG. 21 is a functional block diagram of a three-dimensional data input apparatus 1D according to a fourth embodiment of the present invention. In FIG. 21, the element denoted by the same numerals as in FIG. 15 has the same function as the above-mentioned three-dimensional data input apparatus 1C.

The fourth embodiment does not use a slit light beam but uses a spot light beam V having a spot-like section for image sensing by using a one-dimensional image sensor (a linear sensor) 27. Therefore, the explanation of the second embodiment can be applied to the fourth embodiment.

Though the received light data of the single view point A is used for the data supplementation in the third and the fourth embodiment, each of the received light data of the plural view points A and B can be used for calculating the distance data D' for supplementation. In this case, an identification data can be added to the position information so as to indicate to which view point the supplement data corresponds.

The three-dimensional data input apparatus 1, 1C or 1D of the first, the third or the fourth embodiment can be made up in the same configuration as explained for the second embodiment with reference to FIGS. 14A and 14B.

In the first to the fourth embodiments explained above, the example is mentioned in which the time of intensity peak of each pixel of the image sensing surface, i.e., the barycenter of the intensity distribution (the timescale barycenter) is detected so as to calculate the distance data, but the present invention is not limited to this example. The distance data can be calculated also by detecting the position of the pixel whose intensity is the maximum in each frame, i.e., the barycenter of the spatial intensity distribution (the spatial barycenter). Instead of the scan by deflecting the detection light beam, a color or monochromatic texture image can be used as a stereo view method for calculating the angle that is defined by the view points A and B and the same point on the object Q.

According to the above-mentioned embodiments, the three-dimensional data input that does not use the irradiation angle information of the detection light beam can be realized. Thus, three-dimensional input data with high accuracy can be obtained regardless of the precision of the irradiation angle control, and plural modes can be switched in which data to be used for calculating positions are different from each other.

In addition, according to the third and the fourth embodiments, data dropout regions in which the three-dimensional input data cannot be obtained can be reduced.

What is claimed is:

1. A method of inputting three-dimensional data of an object, the method comprising:

a step of irradiating a detection light beam toward the object;

a step of sensing images of a object at a first position and a second position that is apart from the first position;

a first calculation step of detecting reception angles of the detection light beam reflected by the object at the first and the second positions in accordance with the obtained image data, and calculating the position information of a predetermined part of the object in accordance with the detected first and second reception angles and the distance between the first position and the second position;

a second calculation step of detecting the irradiation angle and the reception angle at the first position in accordance with the irradiation angle data of the detection light beam and the image data of the first position, and calculating the position information of a predetermined part of the object in accordance with the detected irradiation angle and the reception angle; and a step of obtaining the position information of a predetermined part of the object by one of the first and the second calculation steps.

2. The method according to claim 1, wherein the second calculation step is performed for calculating the position information when the position information cannot be calculated by the first calculation step.

3. The method according to claim 1, wherein the second calculation step further includes the step of outputting identification information that indicates to which part the calculated position information corresponds.

4. The method according to claim 1, wherein the irradiation of the detection light beam is performed under the condition where substantially the midpoint position between the first and the second positions is the starting point.

5. The method according to claim 4, wherein the first calculation step further includes the step of detecting the irradiation angle of the detection light beam reflected by the part of the object and the reception angle at the first position in accordance with the irradiation angle data of the detection light beam and the image data corresponding to the first position for the part of the object in which the first and the second reception angles cannot be detected, and performing data supplementation for calculating the position of the part of the object in accordance with the detected irradiation angle and the reception angle.

6. The method according to claim 1, wherein the irradiation of the detection light beam is performed under the condition where the neighborhood of the second position is the starting point.

7. An apparatus for inputting three-dimensional data, the apparatus comprising:

an irradiation device for irradiating a detection light beam toward an object;

an image sensing device for sensing images of the detection light beam reflected by the object at a first position and a second position that is apart from the first position; and an operational device for performing one of a first and a second calculation processes so as to obtain the position information of a predetermined part of the object, the first calculation process including detection of reception angles of the detection light beam reflected by the object at the first and the second positions in accordance with the obtained image data as well as calculation of the position information of a predetermined part of the object in accordance with the detected first and second reception angles and the distance between the first position and the second position, and the second calculation process including detection of the irradiation angle and the reception angle at the first position in accordance with the irradiation angle data of the detection light beam and the image data of the first position as well as calculation of the position information of a predetermined part of the object in accordance with the detected irradiation angle and the reception angle.

8. The apparatus according to claim 7, wherein the second calculation process is performed for calculating the position information when the position information cannot be calculated by the first calculation process.

9. The apparatus according to claim 7, wherein the second calculation process further includes the process of outputting identification information that indicates to which part the calculated position information corresponds.

10. The apparatus according to claim 9, wherein the apparatus has a first mode in which the identification information is output and a second mode in which the identification information is not output.

11. The apparatus according to claim 7, wherein the starting point of the irradiation of the detection light beam by the irradiation device is substantially the midpoint position between the first and the second positions.

12. The apparatus according to claim 11, wherein the first calculation process further includes the process of detecting the irradiation angle of the detection light beam reflected by the part of the object and the reception angle at the first position in accordance with the irradiation angle data of the detection light beam and the image data corresponding to the first position for the part of the object in which the first and the second reception angles cannot be detected, and performing data supplementation for calculating the position of the part in accordance with the detected irradiation angle and the reception angle.

13. The apparatus according to claim 7, wherein the starting point of the irradiation of the detection light beam is in the neighborhood of the second position.

14. The apparatus according to claim 7, wherein the apparatus has a first mode performing the first calculation process and a second mode performing the second calculation process, so that a user can select one of the first and the second modes.

15. The apparatus according to claim 14, the first mode is a mode in which the position information with higher accuracy can be obtained than in the second mode.

* * * * *